United States Patent [19]

Kukreja et al.

[11] Patent Number: 5,237,469
[45] Date of Patent: Aug. 17, 1993

[54] STATIONARY HEAD CARTRIDGE TAPE DRIVE WITH MOVEABLE X-Y TABLE AND METHOD

[75] Inventors: Jagmohan S. Kukreja, Claremont; Kurt A. Buckland, Irvine, both of Calif.

[73] Assignee: Archive Corporation, Costa Mesa, Calif.

[21] Appl. No.: 771,139

[22] Filed: Oct. 3, 1991

Related U.S. Application Data

[63] Continuation of Ser. No. 342,985, Apr. 25, 1989, Pat. No. 5,109,308.

[51] Int. Cl.$^5$ ............................................. G11B 5/008
[52] U.S. Cl. ..................................... 360/93; 360/96.5; 360/106
[58] Field of Search .................. 360/96.5, 96.6, 106, 360/88, 90, 93, 132, 105, 66.1; 242/192, 197, 198, 199, 200

[56] References Cited

U.S. PATENT DOCUMENTS

| | | | |
|---|---|---|---|
| 3,697,085 | 10/1972 | Ban | 360/93 |
| 3,976,262 | 8/1976 | Kennedy | 242/192 |
| 4,099,686 | 7/1978 | Moya | 242/198 |
| 4,498,112 | 2/1985 | Georgens et al. | 360/96.5 |
| 4,556,923 | 12/1985 | Olmsted | 360/93 |
| 4,559,571 | 12/1985 | Olmsted et al. | 360/105 |
| 4,573,091 | 2/1986 | Barton, Jr. et al. | 360/93 |
| 4,586,095 | 4/1986 | Olmsted | 360/93 |
| 4,608,615 | 8/1986 | Zeavin | 360/96.5 |
| 4,622,606 | 11/1986 | Rudi | 360/96.5 |
| 4,636,890 | 1/1987 | Rudi et al. | 360/96.5 |
| 4,673,995 | 6/1987 | Spiegelstein | 360/93 |
| 4,677,508 | 6/1987 | Barton, Jr. et al. | 360/96.5 |
| 4,739,951 | 4/1988 | Zeavin | 242/209 |
| 4,785,363 | 11/1988 | Jacobs et al. | 360/93 |
| 4,796,120 | 1/1989 | Komatsu et al. | 360/96.5 |
| 4,866,552 | 9/1989 | Nagase | 360/96.5 |
| 4,984,111 | 1/1991 | Rudi | 360/96.5 |
| 5,025,334 | 6/1991 | Perona et al. | 360/96.5 |
| 5,109,308 | 4/1992 | Kikreja et al. | 360/93 |

FOREIGN PATENT DOCUMENTS 0114246 11/1983 European Pat. Off. .

OTHER PUBLICATIONS

"True Half-Height 125 MB", Model ST125 High Capacity 5¼ inch Cartridge Tape Drive, Cipher Data Products, Inc. (1986), (1 pg).
Cipher Data: "Series PC60Bi and PC125Fi", 60 MB and 125 MB Half-Height Internal ¼ inch Tape Storage, Cipher Data Products, Inc. (1987), (1 pg).
Cipher Data: "Model ST 150S", 150 MB Half-Height ¼ inch Tape Drive, Cipher Data Products, Inc. (1988), (1 pg).
"True Half-Height 60 MB", Model ST60 5¼ inch Cartridge Tape Drive, Cipher Data Products, Inc. (1986), (2 pgs).

(List continued on next page.)

*Primary Examiner*—Andrew L. Sniezek
*Attorney, Agent, or Firm*—Knobbe, Martens, Olson & Bear

[57] ABSTRACT

The present invention is an end loaded tape drive for an elongate tape cartridge having a door in one of its sides proximate one end of the cartridge. The tape drive includes an elongate table mounted at least partially within an elongate housing upon which the cartridge may rest. The table is movable in an x-y plane defined by an x axis and a y axis. The drive includes a magnetic head which is fixed against movement in an x-y plane. A cartridge door opening mechanism is provided for opening the access door of the cartridge sufficiently to provide access to the tape by the magnetic head. Movement of the table in the y direction actuates the door opening mechanism and movement of the table in the x direction positions the tape in a read/write position. A motor is further provided for moving the length of tape within the cartridge along the magnetic head when the tape is in the read/write position.

35 Claims, 11 Drawing Sheets

OTHER PUBLICATIONS

Brochure—"Microtape EL-5, SL-5" Data Electronics, Inc. (1982).
Brochure—"Microtape EL-6, SL-6", Data Electronics, Inc. (1982) (2 pgs).
Brochure—"Microtape EL-1, SL-51", Data Electronics, Inc. (1982), (2 pgs).
Brochure—"Slider/SL-1", Data Electronics, Inc. (9182), 2 pgs).
Brochure—"Series 440-CT/540-CT Cartridge Tape Drive", (1982), (2 pgs).
Brochure—"Series 540¼ Cartridge Tape Drive", Cipher Data Products, Inc. (1983), (2 pgs).
Brochure—"Series 400 Quarterback Cartridge Tape Drive", Cipher Data Products, Inc. (1981), 92 pgs).

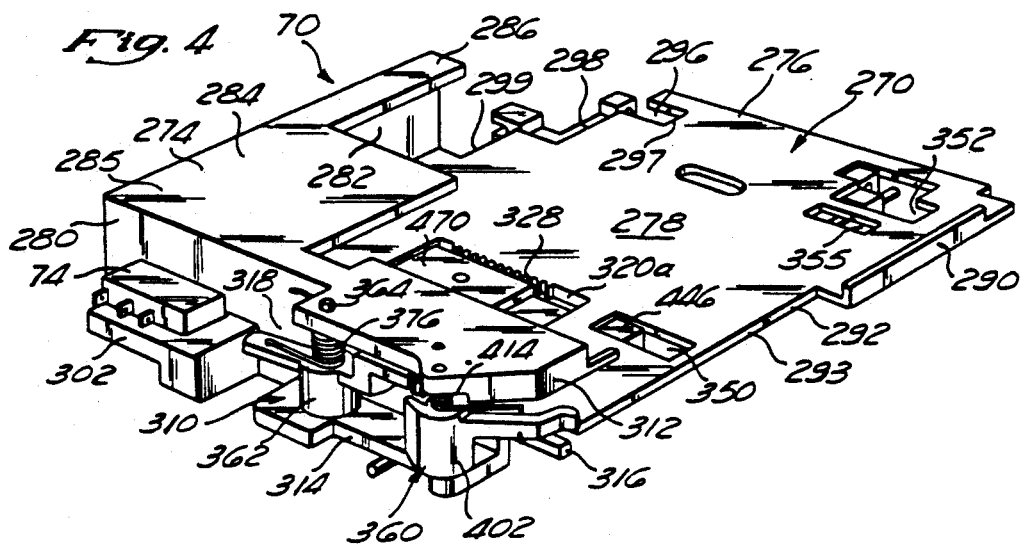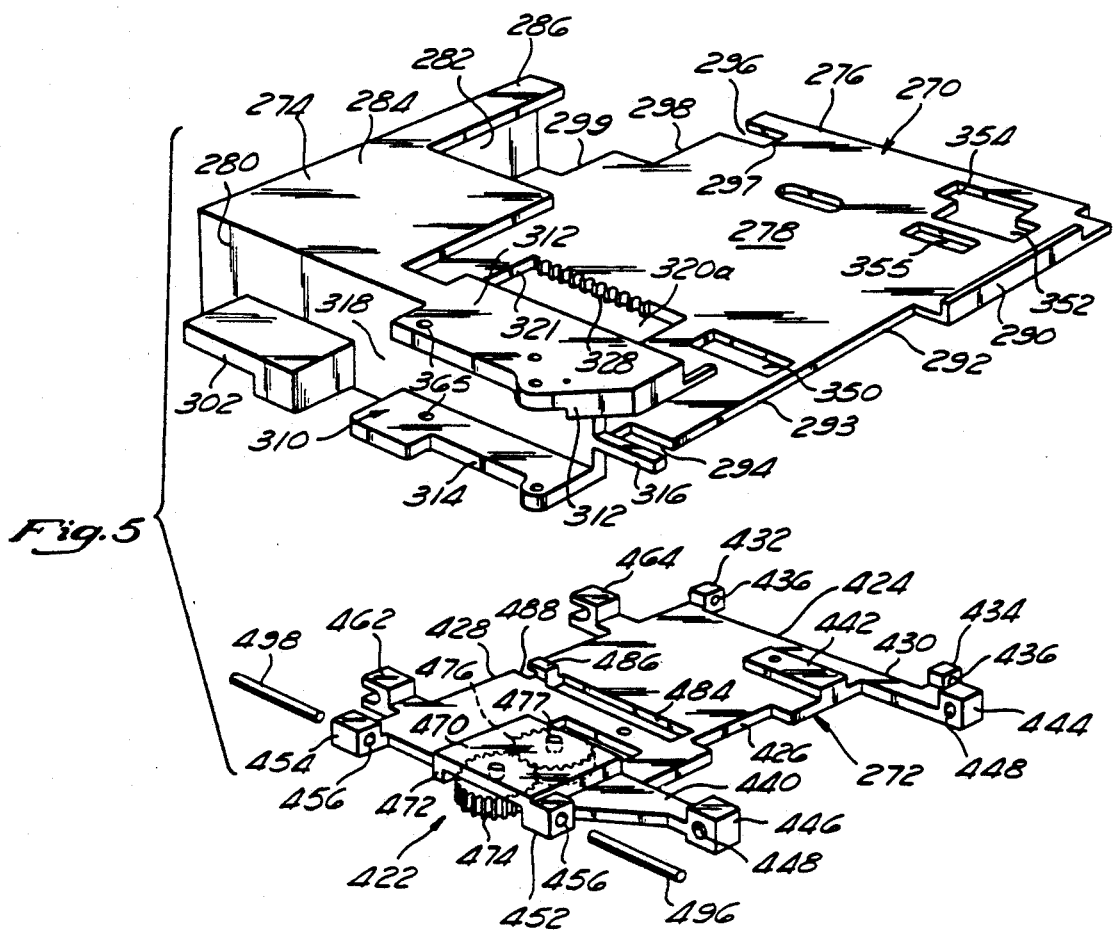

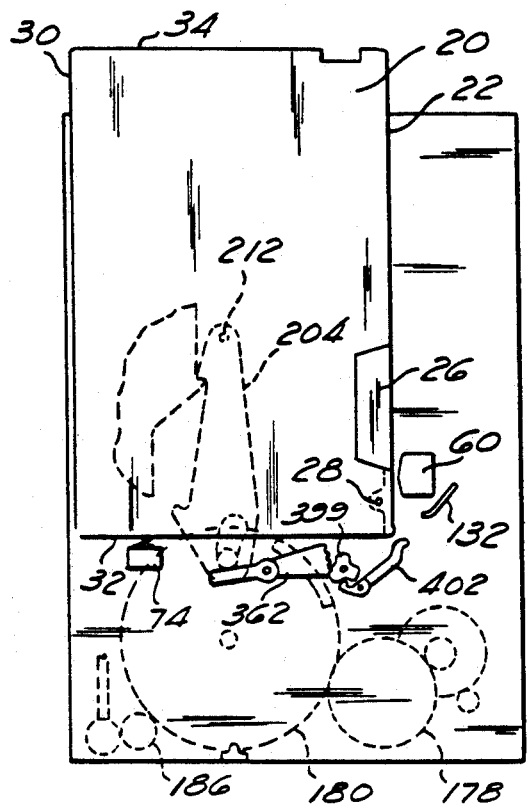
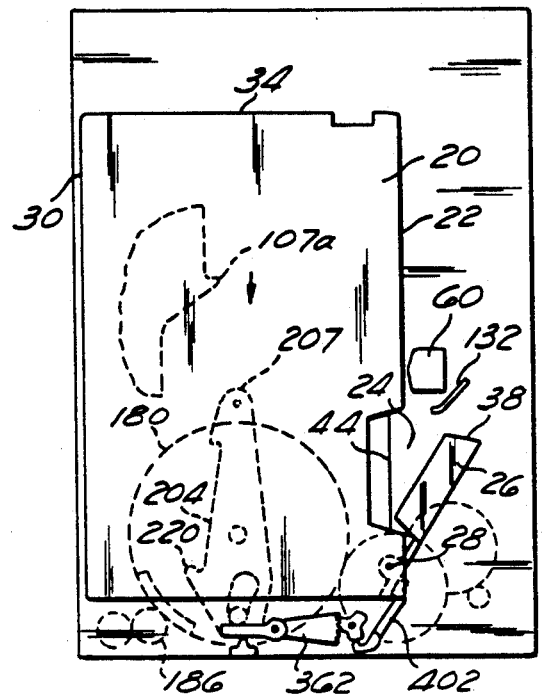
Fig. 12a
Fig. 12b
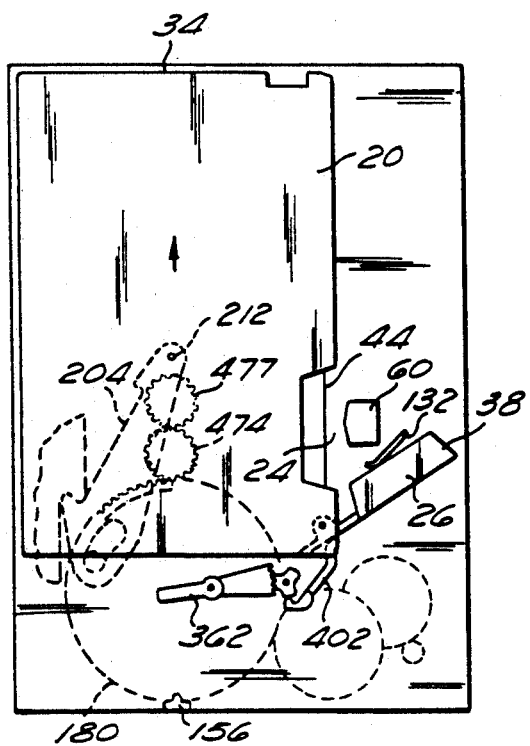
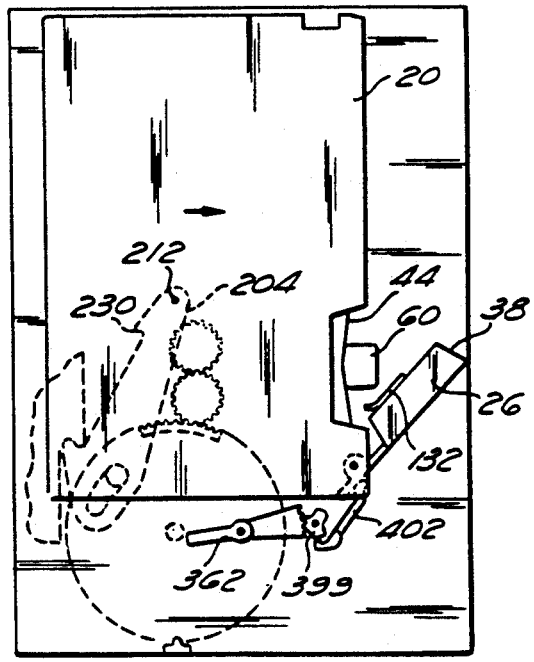
Fig. 12c
Fig. 12d

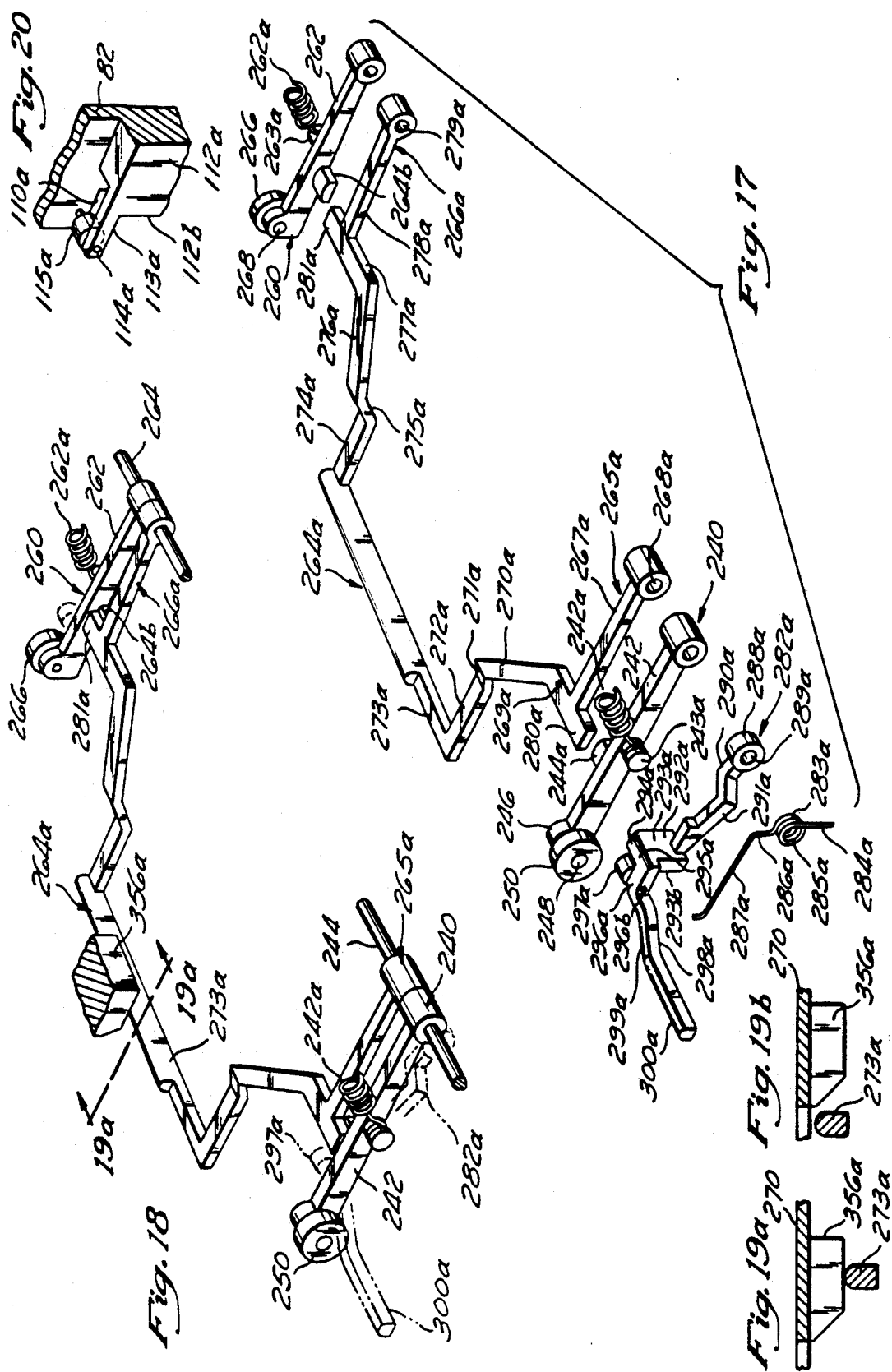

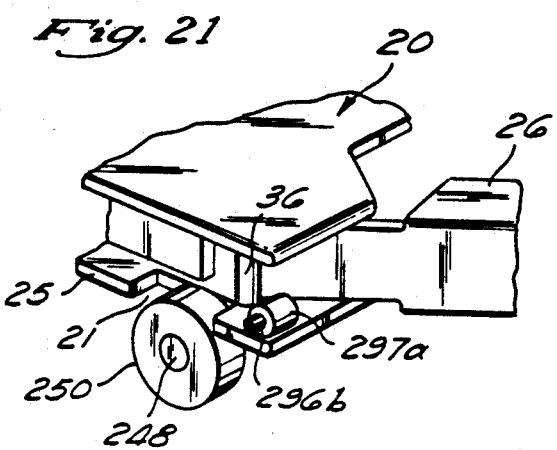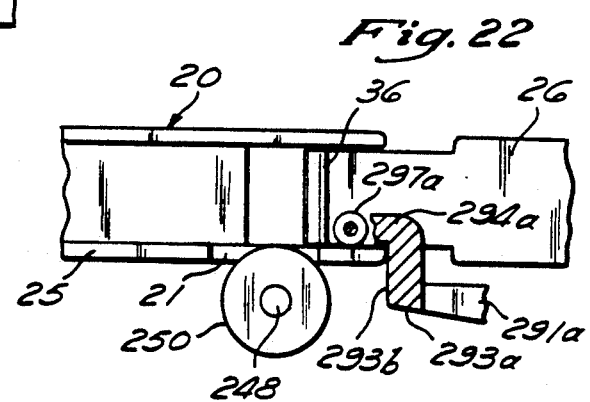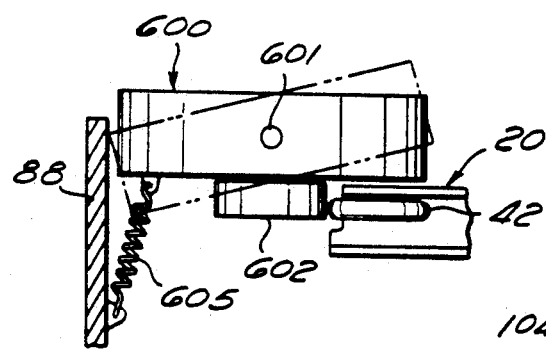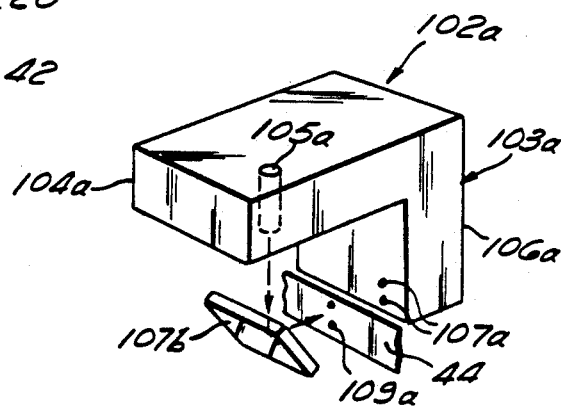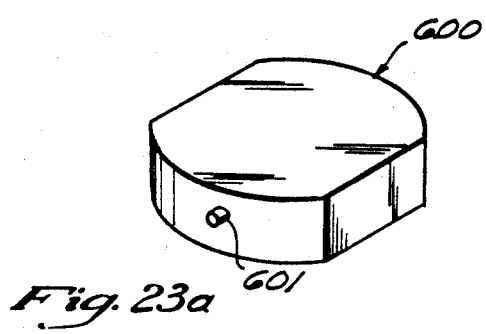

STATIONARY HEAD CARTRIDGE TAPE DRIVE WITH MOVEABLE X-Y TABLE AND METHOD

This application is a continuation of application Ser. No. 07/342,985, filed Apr. 25, 1989, now U.S. Pat. No. 5,109,308.

The present invention relates to magnetic tape drives and more particularly, to a compact drive for standard tape cartridges similar to the type described in American Standard ANSI X3.55-1977 and U.S. Pat. No. 3,692,255 entitled "Belt Drive Tape Cartridge."

Most personal and small business computers were originally designed for the use of flexible or floppy disk memories. However, the 5¼ inch tape drive has achieved great popularity for backup purposes due to its substantially greater storage capacity and rapid data access capabilities.

To ensure the interchangeability of flexible disk drives, an industry standard has been established which requires that these drives be constructed so that they fit within a "full height form factor" (of approximately 3¼ inches in height by 5¾ inches in width by 8 inches in length) or a "half height form factor" (of approximately 1⅝ inches in height by 5¼ inches in width by 8 inches in length) (hereinafter referred to collectively as "the 5¼ inch form factor"). Accordingly, it is desirable that a 5¼ inch tape drive which replaces a floppy disc drive fit within the 5¼ inch form factor.

As the industry has almost universally adopted a standard ¼-inch tape cartridge, as defined by ANSI X3.55-1977, it is important that any 5¼ inch tape drive be compatible with this standard ¼-inch tape cartridge. This cartridge is approximately 4 inches in width and 6 inches in length. Access to the tape by the magnetic read-write head of the tape drive is provided by means of a hinged door in one of the sides of the cartridge, proximate one of the ends. It will be appreciated that the overall width of the cartridge, when the door is open, is approximately equal to the width limit of the 5¼ inch form factor.

Although 5¼ inch tape drives have been developed, most of these drives require movement of the read/write head to engage the tape within the cartridge. In some applications this is undesirable, and there is needed a reliable, efficient "stationary head" (i.e., wherein the head is moved only for purposes of switching from one track to another on a single tape) tape drive.

SUMMARY OF THE INVENTION

The present invention is an end loaded tape drive for an elongate tape cartridge having a door in one of its sides proximate one end of the cartridge. The tape drive includes an elongate table mounted at least partially within an elongate housing upon which the cartridge may rest. The table is movable in an x-y plane defined by an x axis and a y axis. The drive includes a magnetic head which is fixed against movement in an x-y plane. A cartridge door opening mechanism is provided for opening the access door of the cartridge sufficiently to provide access to the tape by the magnetic head. Movement of the table in the y direction actuates the door opening mechanism and movement of the table in the x direction positions the tape in a read/write position (i.e., a position wherein the head and the tape are positioned relative to one another such that sufficient head contact with the tape is provided so that the head can read from and/or write on the tape). A motor is further provided for moving the length of tape within the cartridge along the magnetic head when the tape is in the read/write position.

Another aspect of the invention is a drive for an elongate tape cartridge having a door in one of its sides proximate one end of the cartridge. The drive includes an elongate housing having one end which defines a slot which defines an x axis, a y axis and a z axis. The respective axes are mutually orthogonal so as to define a coordinate system, with the housing end defining the slot extending in the x-z plane. The slot is sized and shaped to receive one of the ends of the cartridge when the cartridge is aligned with the slot in the x-z plane and is inserted along the y axis in the x-y plane. The drive incorporates a magnetic head having a read/write face in a generally y-z plane and a mechanism for opening the door of the cartridge sufficiently to provide access to the tape by the head. An elongate table is mounted at least partially within the housing upon which the cartridge may rest. The table is mounted so that the ends of the table are movable along the y axis and along a pair of axes parallel to the x axis. Movement of the ends of the table along the y axis actuates the door opening mechanism and the movement of the ends of the table along the pair of axes parallel to the x axis brings the tape into a read/write position relative to the head. The drive is additionally provided with a motor for moving the tape within the cartridge along the magnetic head.

Another aspect of the invention is a method of bringing a length of tape within an elongate rectangular cartridge into a read/write position with a magnetic head positioned within a housing of a drive for the cartridge, wherein the housing defines a space and one end of the housing defines an elongate slot into which the ends of the cartridge are insertable. The method includes inserting both of the ends of the cartridge through the slot, then moving the access door past the magnetic head. The access door is then opened and the portion of the length of tape within the access is moved toward the magnetic head.

BRIEF DESCRIPTION OF THE DRAWINGS

These and other features of the invention will now be described with reference to a preferred embodiment, which is intended to illustrate, and not to limit, the principles of the present invention:

FIG. 4 is a top perspective view of the x-y table of the tape drive of FIG. 1;

FIG. 5 is an exploded top perspective view of the x-y table of FIG. 4;

FIGS. 12a-12d are partially schematic views illustrating various stages of the operation of the tape drive and cassette of FIG. 1;

FIG. 17 is an exploded perspective view of the unloader bar, cartridge stop and detent rollers of the tape drive of FIG. 1;

FIG. 18 is an assembly view of the unloader bar, cartridge stop and detent rollers of FIG. 17;

FIGS. 19a-19b are schematic views illustrating the interaction of the spacer block and unloader bar of FIG. 18;

FIG. 20 is an enlarged perspective view illustrating the second registration roller of the tape drive of FIG. 1;

FIG. 21 is an enlarged schematic view illustrating the registration of a cartridge by the tape drive of FIG. 1;

FIG. 22 is an enlarged schematic view illustrating the registration of a cartridge by the tape drive of FIG. 1;

FIG. 23 is a schematic view illustrating the mounting arrangement of the capstan drive motor of the tape drive of FIG. 1;

FIG. 23a is a perspective schematic view of the capstan drive motor of FIG. 23;

FIG. 24 is a schematic view of the EOT/BOT sensor of the tape drive of FIG. 1.

DESCRIPTION OF THE PREFERRED EMBODIMENT

Figure 1:
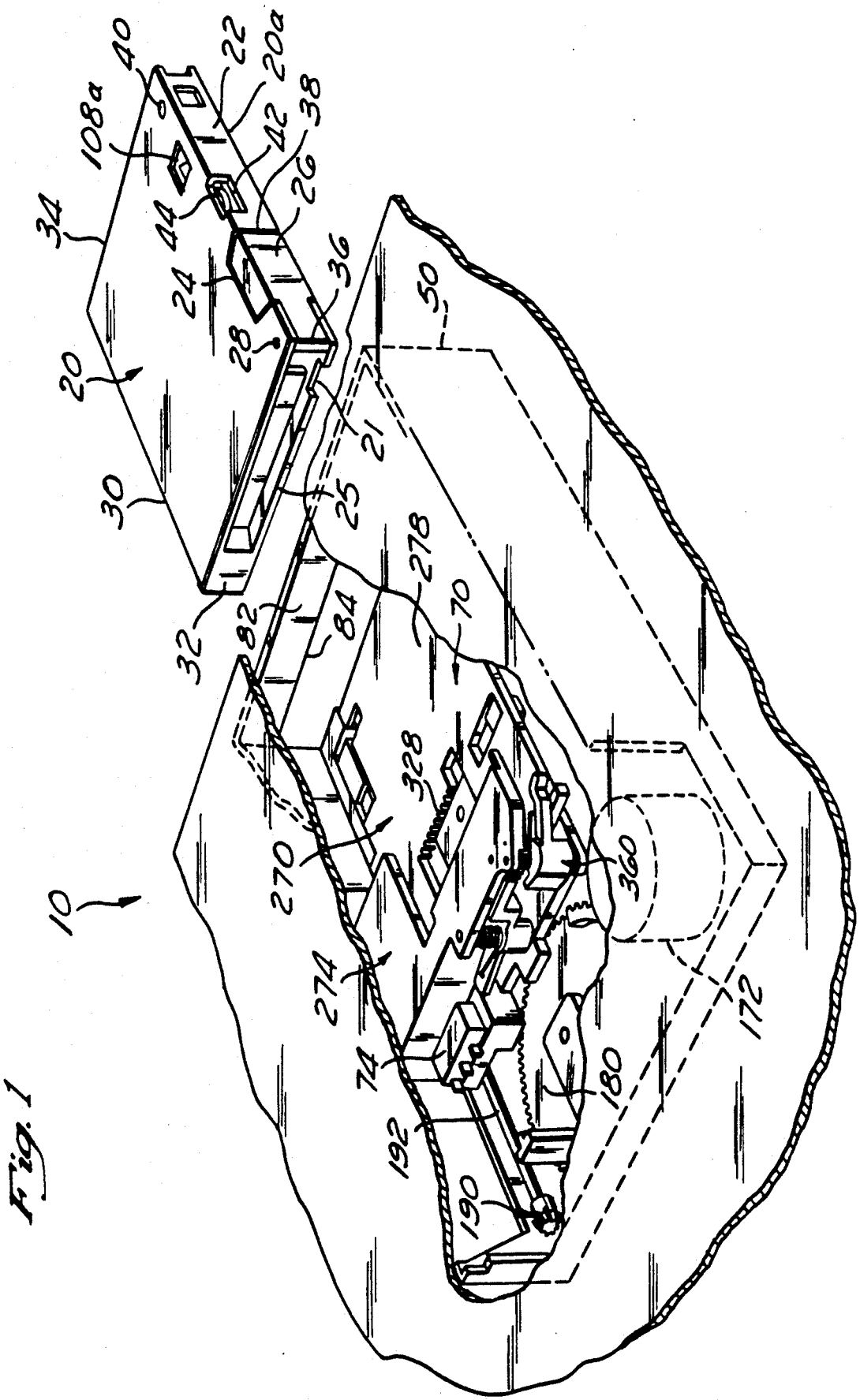
FIG. 1 is a partially cut-away perspective view of a tape drive and cartridge in accordance with the principles of the present invention.

Referring to FIG. 1, there is shown a tape drive 10 and a magnetic tape cartridge 20 insertable therein.

Figure 11A:
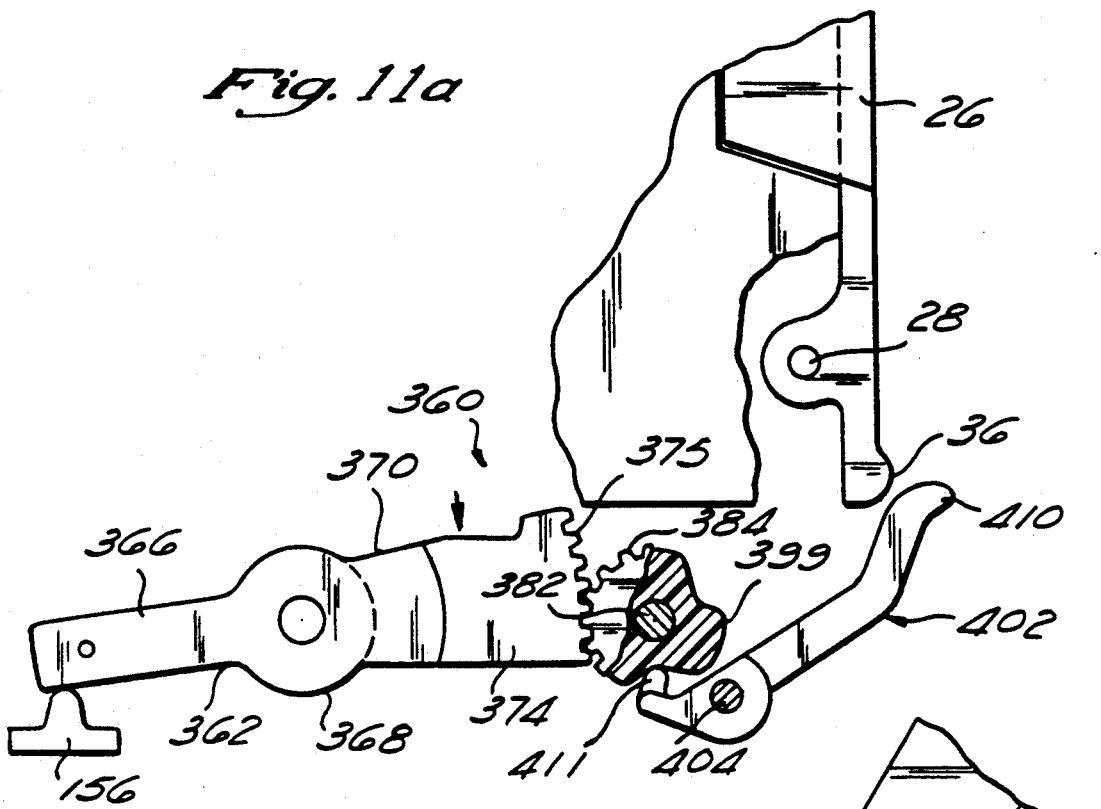
FIG. 11a is an enlarged partially cut-away perspective view illustrating the operation of the door opening mechanism of FIG. 8 prior to actuation.
Figure 11B:
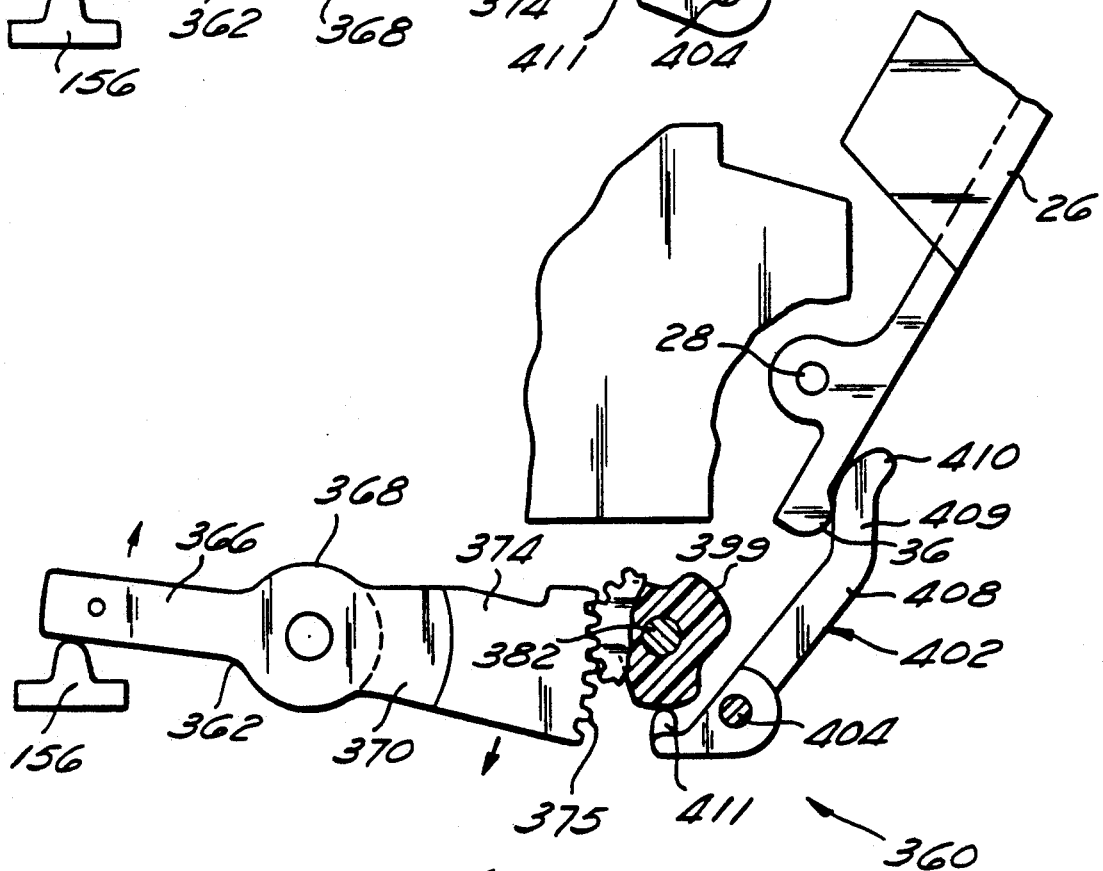
FIG. 11b is an enlarged partially cut-away perspective view of the door opening mechanism of FIG. 8, after actuation.

The tape cartridge 20 is a standard generally elongate rectangular tape cartridge, such as would meet the ANSI X3.55-1977 standards for ¼-inch tape cartridges. The cartridge 20 has a generally rectangular base plate 20a, an elongate access side 22, at one end of which is formed an access 24, or opening, which is covered by a spring-loaded access door 26 which rotates about a hinge 28, an elongate closed side 30 opposite the access side 22, a hinge end 32 located proximate the access door 26, and a closed end 34 opposite the hinge end 32. As shown in FIG. 11a, the door 26 includes a flange 36 extending toward the hinge end 32 of the cartridge 20 from the hinge 28 and an access end 38 opposite the flange 36, At the hinge end and the closed end of the base plate proximate the access side are a pair of generally rectangular detents 21, or notches. As is well-known in the art, the cartridge includes two coplanar hubs or spools (not shown) loaded with ¼-inch wide magnetic tape which is transported between the hubs by an internal belt which is coupled by an internal belt capstan to the external drive. The cartridge also includes an operator-rotatable plug 40 to selectively prevent writing or erasing the tape, and a capstan roller 42 within a capstan roller 44 within a capstan roller window 44.

The tape drive 10 includes an elongate, generally rectangular housing 50 in which is mounted a magnetic read/write head 60 (FIG. 8) and an x-y table 70 (FIG. 6) upon which the cartridge 20 rests after it has been inserted into the housing 50. The x-y table 70 is so named because it is movable in a y direction (i.e., in a direction parallel to a y axis (which will be defined hereinafter)) which, in the case of the illustrated embodiment, is parallel to the direction the cartridge 20 is inserted into the housing 50, and in an x direction (i.e., in a direction parallel to an x axis (which will be defined hereinafter)) which, in the case of the illustrated embodiment, is perpendicular to the direction the cartridge 20 is inserted into the housing 50.

In general, the hinge end 32 of the cartridge 20 is manually inserted into the housing 50 in the y direction so that it is received and rests upon the x-y table 70. This insertion triggers a microswitch 74 which causes the x-y table 70 to move automatically in the y direction past the head 60 (i.e., from a point too close to the receiving end of the housing for the head 60 to be able to engage the length of tape 44 within the access 24 if the access door were sufficiently open to a point too close to the back end of the housing for the head 60 to be able to engage the length of tape 44 within the access 24 if the access door were sufficiently open) until the movement of the x-y table 70 actuates a mechanism which partially opens the access door 26 of the cartridge 20. The x-y table 70 then automatically moves opposite the y direction opposite its initial path more fully opening the door 26, until the access 24 is positioned in the x direction from the head 60. Still operating automatically, the x-y table 70 moves in the x direction, until the length of tape 44 within the access 24 is moved into a read/write position against the head 60.

The various components of the tape drive 10 will now be discussed in detail:

The Housing

Figure 2:
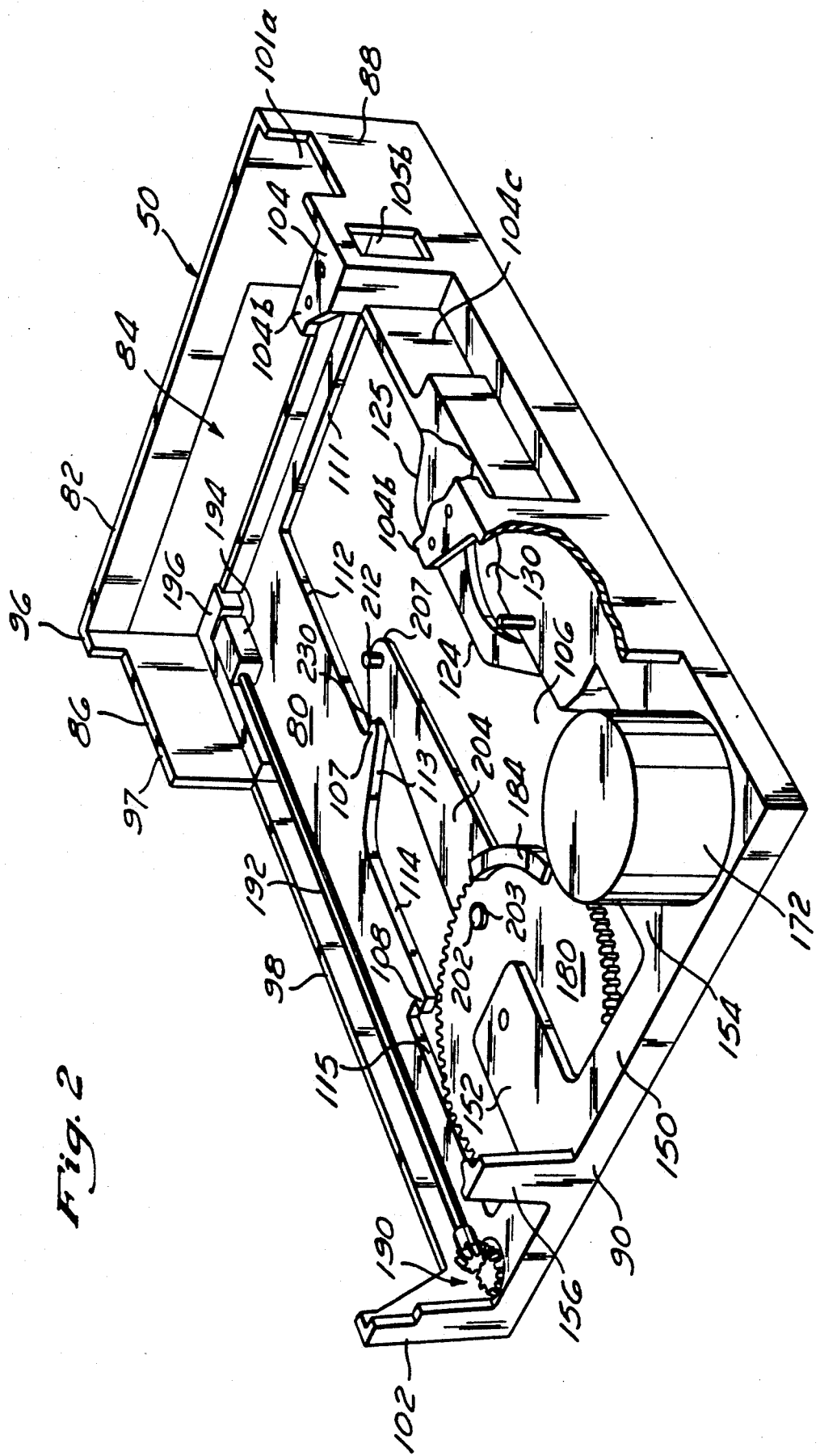
FIG. 2 is a top perspective view of the housing of the tape drive of FIG. 1.
Figure 3:
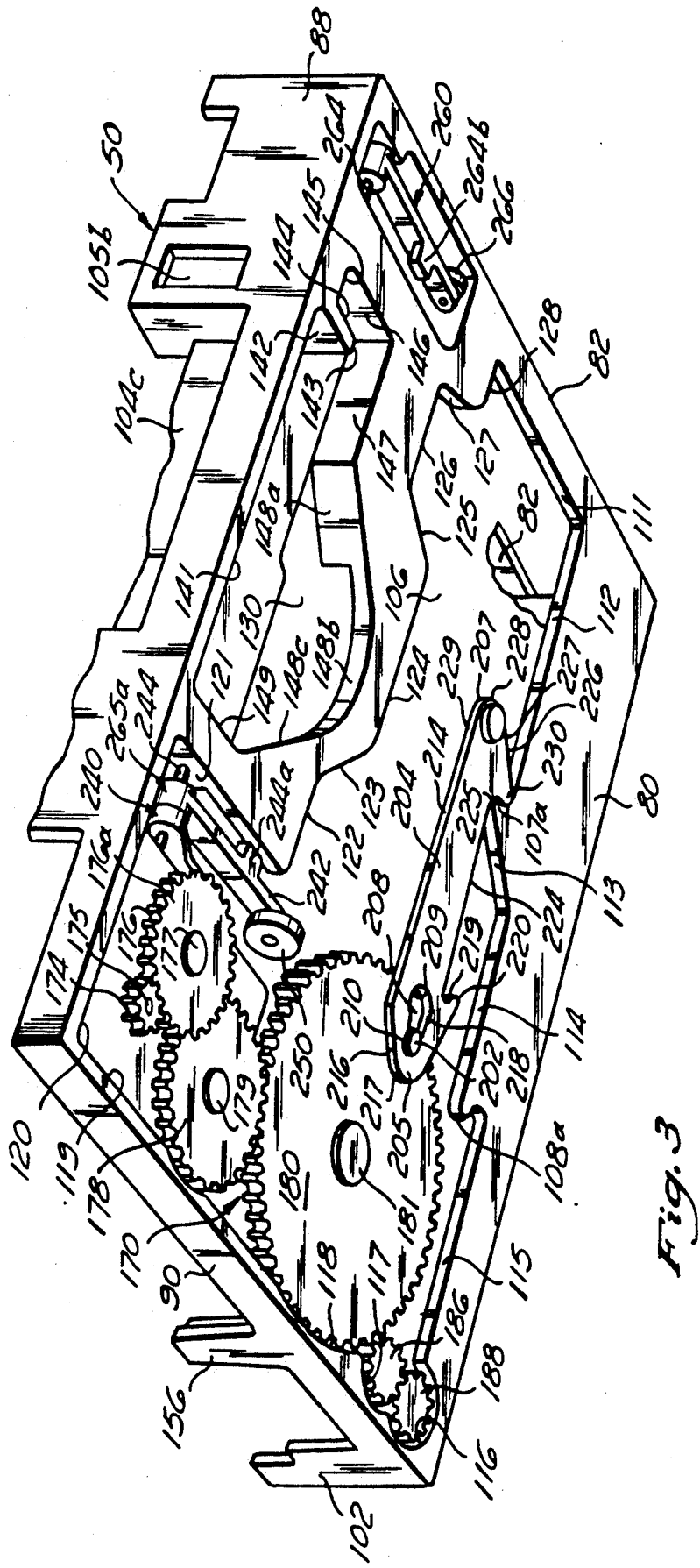
FIG. 3 is a bottom perspective view of the housing of the tape drive of FIG. 1.

Referring now to FIGS. 2 and 3, the housing 50 includes a generally rectangular base 80 and an upstanding, generally rectangular receiving end 82. The receiving end 82 forms a generally rectangular slot 84 having dimensions slightly larger than the ends of the cartridge 20, so that when the end of the cartridge 20 is aligned with the slot 84, the cartridge 20 is easily insertable therethrough. The slot 84 is offset to one side of the receiving end 82 so that one edge of the slot 84 is formed by a first vertical side wall 86 of the housing 50 which extends perpendicularly to the receiving end 82. The slot 84 is spaced approximately 1½-inches from a second vertical side wall 88 which likewise extends perpendicular to the receiving end 82 of the housing 50. The first and second side walls 86, 88 are joined at the opposite end of the housing 50 by a back end 90, which is parallel to the receiving end 82 of the housing 50 and is perpendicular to the side walls 86, 88. The first side wall 86 includes a front end portion 96 having a height approximately equal to the receiving end 82 of the housing 50, a middle portion 97 slightly shorter than the front end portion 96 and a substantially shorter elongate back portion 98 extending substantially the length of the housing 50. At the corner between the back end 90 and the first side wall 86 is a vertical corner support, or angle 102. The second side wall 88 is formed by a first portion 104 approximately equal in height to the receiving end 82 which extends substantially the entire length of the housing 50 and a second portion 105 proximate the back end 90 of the housing 50 having a height equal to the base 80. The housing 50 need not be totally enclosed, but preferably defines a 5¼ inch form factor by means of its maximum overall height, width and length.

Figure 16:
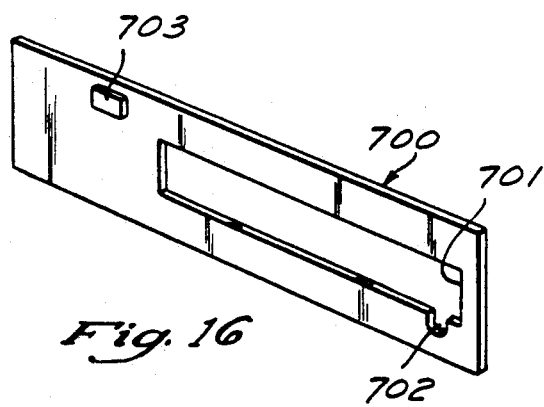
FIG. 16 is a perspective view of a bezel for use with the tape drive of FIG. 1.

As shown in FIG. 16, an elongate bezel 700 may be provided. The bezel would be mounted adjacent the receiving end of the housing. The bezel desirably forms an elongate slot 701 generally corresponding to the slot of the housing, and sized and shaped so that the ends of the cartridge are insertable therethrough. Desirably, the bezel includes a notch 702 to provide access for a manual cartridge ejection system to be described hereinafter. Likewise, the bezel 700 may also be provided with a standard push button mechanism 703 for automatically ejecting the cartridge.

Proximate the corner between the receiving end and the second side wall, the first portion defines a rectangular notch 101a within which an EOT/BOT sensor is desirably mounted. As shown in FIG. 24, the device may include a EOT/BOT sensor 102a having a generally L-shaped mount 103a having an overhanging flange portion 104a which defines a cavity 105b in which an LED 105a may be mounted and an upright portion 106a in which a pair of light sensors 107a may be mounted. During operation, the LED 105a or other suitable device emits light which is reflected off of a mirror 107a positioned within a window 108a (FIG. 1) in the access side 22 of the cartridge 20. Ordinarily, the tape 44 within the cartridge prevents the light from being detected by the light sensors 107b in the upright portion 106a of the mount. However, as is well-known in the art, a series of holes 109a are provided at the end of the tape and the beginning of the tape to enable the light to pass through the tape and be detected by the light sensors 107a. The first portion of the second side wall additionally forms a capstan drive motor opening 104c proximate to the notch 101a, which is positioned between a pair of mounts 104b to which a capstan drive motor may be secured.

As shown in FIG. 20, at the lower second side wall end of the slot 84 is a generally rectangular notch 110a having a lower edge 111a which is integrally formed with the lower edge of the slot 84. Adjacent the notch 110a is a generally rectangular registration roller support 112a. The support 112a includes a second engagement surface 112b parallel to the end of the slot 84. A finger 113a extends from the support 112a, generally parallel to the lower edge of the slot 84 and spaced slightly from the receiving end of the slot 84. A horizontal pin 114a is secured at either end by the distal end of the finger and the receiving end of the housing. A second registration roller 115a, the significance of which will be discussed below, is rotatably mounted on the pin 114a so that the bottom of the roller extends slightly below the bottom of the finger 113a.

As best seen in FIGS. 2 and 3, the base 80 includes an irregularly shaped central cut-out, or opening 106. Beginning at the edge of the central cut-out 106 proximate the receiving end 82 and moving in a clockwise direction, as seen in FIG. 3, the central cut-out 106 includes a first elongate vertical edge 111 parallel to the receiving end 82 of the housing 50. The side of the first edge proximate to the first side wall forms a right angle with and is connected to a second vertical elongate edge 112 parallel to the first side wall 86. At the end of the second edge 112 opposite the receiving end 82 of the housing 50 is a first S-shaped edge 107a which forms a first lip 107 which extends away from the first side wall 86 and away from the back end 90 of the housing 50. The end of the first S-shaped edge 107a opposite the second edge 112 is integrally joined with a third elongate vertical edge 113 which extends toward the first side wall 86 and away from the receiving end 82 of the housing 50 so as to form an angle of approximately 60° with the housing 50. A fourth elongate vertical edge 114 parallel to the first side wall 86 is integrally formed with the end of the third edge 113 opposite the second edge 112. The end of the fourth edge 114 opposite the third edge 113 is integrally formed with a second S-shaped edge 108a which forms a second lip 108 which extends away from the first side wall 86 and toward the back end 90 of the housing 50. The end of the second S-shaped edge 108a opposite the fourth edge 114 is integrally joined to a straight fifth vertical edge 115 which is spaced toward the first side wall 111 from the fourth edge 114 and is parallel to the first side wall 86. At the end of the fifth edge 115 opposite the second S-shaped edge is an arcuate sixth vertical edge 116 which defines an arch of approximately 270°. The end of the sixth edge 116 opposite the fifth edge 115 is connected to an arcuate seventh edge 117 which defines an arc of approximately 120 degrees which has a radius approximately equal to that of the sixth edge 116. At the end of the seventh edge 117 opposite the sixth edge 116 the seventh edge 117 is connected to an arcuate eighth vertical edge 118 defining an arc of approximately 60 degrees and having a radius substantially larger than the seventh edge 117.

Integrally formed with the end of the eighth edge 118 opposite the seventh edge 117 is a straight elongate ninth vertical edge 119 parallel to the back end 90 of the housing 50 which extends to the second side wall 88 of the housing 50. The end of the ninth edge 119 opposite the eighth edge 118 forms a ninety degree angle with a tenth edge 120 which is parallel to the second side wall 88 and extends slightly longer than the fifth edge 115.

The end of the tenth edge 120 opposite the ninth edge 119 forms a ninety degree angle with a straight eleventh vertical edge 121 which extends toward the first side wall 86 from the second side wall 88 parallel to the back end 90 of the housing 50. The end of the eleventh edge 121 opposite the tenth edge 120 is connected to a twelfth vertical edge 122 which extends parallel to the second side wall 88. The end of the twelfth vertical edge 122 opposite the eleventh vertical edge 121 is connected to a thirteenth vertical edge 123 which extends toward the first side wall 86 and the receiving end 82 of the housing 50 so as to form an angle of approximately 60 degrees with the second side wall 88. The end of the thirteenth edge 123 opposite the twelfth edge 122 is connected to a straight fourteenth vertical edge 124 which extends parallel to the second side wall 88. The end of the fourteenth edge 124 opposite the thirteenth edge 123 is connected to a straight fifteenth vertical edge 125 which extends toward the second side wall 88 and the receiving end 82 of the housing 50 at an angle so as to form an angle of approximately 60 degrees with the second side wall 88. The end of the fifteenth edge 125 opposite the fourteenth edge 124 is connected to a straight sixteenth vertical edge 126 which extends parallel to the second side wall 88. The end of the sixteenth edge 126 opposite the fifteenth edge 125 forms a right angle with a straight vertical seventeenth edge 127. The end of the seventeenth edge 127 opposite the sixteenth edge 126 forms a right angle with a straight elongate eighteenth vertical edge 128 which extends toward the receiving 82 end of the housing 50. The end of the eighteenth vertical edge 128 opposite the seventeenth vertical edge 127 forms a right angle with and is connected to the end of the first edge 111 opposite the second edge 112.

Between the fourteenth edge 124 and the second side wall 88 is a head assembly aperture 130 which provides access for a head positioning assembly (FIGS. 13-14) which will be described in detail hereinafter. Proximate the head assembly aperture 130 is a generally rectangular vertical head guard 132 (FIGS. 8 and 12a-d) which forms an angle of 45 degrees with the back end 90 of the housing 45. Referring to FIG. 3, the aperture 130 has a straight elongate vertical first section 141 parallel to the second side wall 83. Moving in a clockwise direction, the end of the first section 141 proximate the receiving end 82 of the housing 50 forms a right angle with and is connected to a straight elongate vertical second section 142 which extends toward the second side wall 88 of the housing 50. The end of the second section 142 opposite the first section 141 is forms a right angle with and is connected to a short straight vertical third section 143 which is parallel to the second side wall 88. The end of the third section 143 opposite the second section 142 forms a right angle with and is connected to a straight elongate vertical fourth section 144 which is parallel to the receiving end 82 of the housing 50. The end of the fourth section 144 opposite the third section 143 forms a right angle with and is connected to a straight elongate vertical fifth section 145 which is parallel to the second side wall 88. The end of the fifth section 145 opposite the fourth section 144 forms a right angle with and is connected to a straight elongate vertical sixth section 146 extending toward the first side wall 86 of the housing 50. The end of the sixth section 146 opposite the fifth section 145 forms a right angle with and is connected to a straight elongate vertical seventh section 147 which is parallel to the second side wall 88 of the housing 50. The end of the seventh section 147 opposite the sixth section 146 is connected to an elongate angular vertical eighth section 148. The eighth section 148 is formed by a straight elongate first portion 148a which forms an angle of approximately sixty degrees with, and is connected to, the seventh section 147, an arcuate second portion 148b which is connected to the end of the first portion 148a opposite the seventh section 147, and a straight elongate third portion 148c connected to the second portion 148b. The arcuate portion 148b extends toward the first side wall 86 from the first and third portions 148a, 148c and the first and third portions 148a, 148c form an angle of approximately 120 degrees with one another. The end of the third portion 148c of the eighth section 148 opposite the second portion 148b forms an angle of approximately 120 degrees with and is connected to a straight elongate vertical ninth section 149 which is parallel to the receiving end 82 of the housing 50. The end of the ninth section 149 opposite the third portion 148c of the eighth section 148 forms a right angle with and is connected to the end of the first section 141 opposite the second section 142.

Referring now to FIG. 2, along the back end of the cutout 106 is generally elongate overhanging flange 150 having a thickness approximately equal to the thickness of half the base 80. At the corner between the first side wall 86 and the back end 90 of the housing 50 the base 80 extends toward the receiving end 82 of the housing 50 a distance slightly larger than twice the radius of the sixth and seventh edges 116,117 of the cutout 106, so as to form a pair of covered recesses. At a point corresponding to approximately the middle of the slot 84 in the receiving end 82 of the housing 50, the flange 150 extends substantially further toward the receiving end 82 of the housing 50 forming a generally rectangular tongue portion 152. Likewise, at the corner between the back end 90 of the housing 50 and the second side wall 88, the flange 150 extends substantially further toward the receiving end 82 of the housing 50, forming a generally rectangular gear motor support portion 154. Extending vertically from the back end 90 of the base 80, at a point corresponding to the middle of the slot 84 in the receiving end 82 of the housing 50 is a generally T-shaped flange 156. The cross part of the T is integrally formed with and parallel to the back end 90 of the housing 50 and the stem of the T extends parallel to the side walls 86,88 of the housing 50 toward the receiving end 82. In addition, the base includes a generally rectangular cutout 157a proximate the junction between the receiving end and the second side wall of the housing (FIG. 3).

The Housing Gear System

Referring now to FIGS. 2-3, the gear assembly 170 of the housing 50 will now be described. A generally cylindrical gear drive stepper motor 172 is supported at the corner between the second side wall 88 and the back end 90 of the housing 50 by the gear motor support portion 154 of the flange 150. A motor pinion or gear 174 is fixed to the distal end 175 of a drive shaft depending from the stepper motor 172 through the gear motor support portion 154 of the base 80.

Spaced slightly toward the receiving end 82 of the housing 50 from the motor pinion 174 is a cluster gear 176 comprised of a larger diameter lower gear 176a, significantly larger in diameter than the motor pinion 174, and a smaller diameter upper gear 176b (not shown). The cluster gear 176 is rotatably mounted on a shaft 177 secured to the housing 50. The lower gear 176a of the cluster gear 176 is in meshing engagement with the motor pinion 174 while the upper gear 176b is in the meshing engagement with an idler gear 178. The idler gear 178 is rotatably mounted on a shaft 179 secured to the housing 50 and has a diameter larger than that of the lower gear 176a of the cluster gear 176 and significantly larger than that of the upper gear 176b of the cluster gear 176. The idler gear 178 is positioned toward the first side wall 86 and toward the back end 90 of the housing 50 from the cluster gear 176.

The idler gear 178 is in meshing engagement with a main gear 180 which is rotatably mounted to a shaft 181 which depends from the tongue portion 152 of the flange 150. The main gear 180 has a radius substantially larger than that of the idler gear 178 and is mounted on the tongue portion 152 of the flange 150 so that the diameter of the main gear 180 conforms to, yet is spaced from, the eighth edge 118 of the base 80. Secured above and parallel to the teeth of the main gear 180 is an arc-shaped rack 184 having a radius of curvature equal to that of the main gear 180.

As will be appreciated, the gear assembly 170 permits the precise positioning of the main gear 180 by the stepper motor 172. That is, the motor pinion 174 and the lower gear 176a of the cluster gear 176 operate as one step of a reduction process, the upper and lower gears 176a,176b of the cluster gear 176 operate as a second step, the upper gear 176b of the cluster gear 176 and the idler gear 178 act as a third step and the idler gear 178 and the main gear 180 operate as a fifth step.

Figure 15:
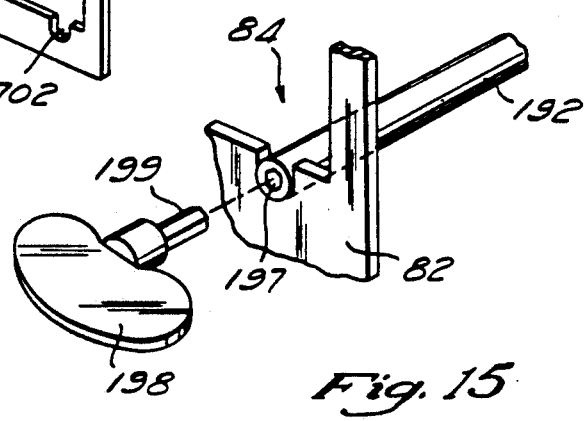
FIG. 15 is a partial perspective view illustrating the manual tape eject mechanism of the tape drive in FIG. 1.

The main gear 180 is also in meshing engagement with a smaller diameter first gear 186 which is positioned within a recess formed by the seventh edge 117 of the cutout 106 and is rotatably mounted on a shaft depending from the flange 150 at the back end 90 of the housing 50. The first gear 186 is in meshing engagement with a second gear 188 which is positioned within a recess formed by the sixth edge 116 of the cutout 106. This second gear 188 is rotatably mounted on a shaft depending from the housing 50. The second gear 188 is in meshing engagement with a differential 190 (shown in FIG. 2) which extends through an aperture (not shown) in the flange 150 proximate the corner between the first side wall 86 and the back end 90 of the housing 50. The differential 190 is fixed to the back end of an elongate guide or rod 192 which extends parallel the first side wall 86 through a generally rectangular retaining block 194 and a generally L-shaped alignment block 196 to the receiving end 82 of the housing 50. As best seen in FIG. 15, in the end of the guide 192 at the receiving end 82 of the housing 50 is a coaxial hexagonal bore 197 which is adapted to receive a mating hexagonal shaft 199 of a key 198, which can be used to rotate the guide 192 and, therefore, the differential 190.

The Link

A pivot pin 202 depends from the main gear 180 proximate the left side of the rack 184, as shown in FIG. 2. Referring now to FIGS. 2-3 and 12a-d, a substantially rigid elongate link 204, having a first end 205 and a second end 207, extends generally between the receiving end 82 and back end 90 of the housing 50 within the central cutout 106. The first end 205 of the link 204 defines an oblong opening 208, itself having a first end 209 and a second end 210, through which the pivot pin 202 depending from the main gear 180 extends. The pivot pin 202 is provided with an enlarged head 203 which has a diameter greater than the pin 202 which secures the link 204 within the opening of the main gear 180. The second end 207 of the link 204, opposite the main gear 180 is provided with a raised stud 212, the purpose of which will be described hereinafter.

Extending between the first end 205 and the second end 207 of the link 204, along the second side wall 88 side of the link 204 is a generally straight elongate first vertical face 214. The end of the first face 214 proximate the first end 205 of the link 204 is a generally angular second vertical face 216 having a straight portion 217 which forms an angle of approximately 65° with the first face 214 at a position corresponding approximately to the second end 210 of the opening 208 and an arcuate portion 217 forming an arc of approximately 165° at a point approximately corresponding to the first end 209 of the opening 208 and a second straight portion 218 extending to approximately the second end 210 of the opening 208 which forms an angle of approximately 50° with the first arcuate portion 217.

The end of the second portion 218 of the second face 216 opposite the first end 207 of the opening 208 is connected to an S-shaped third vertical face 219 which cooperates with the second portion 218 of the second face 216 to form a first hook 220. The end of the third face 219 opposite the second face 216 is connected to a straight elongate fourth vertical face 224 which extends generally parallel to the first face 214 toward the second end 207 of the link 204. The end of the fourth face 224 opposite the third face 219 is an S-shaped fifth vertical face 225 which curves initially outward and back toward the first end 205 of the link 204 to form a second hook 230. The end of the fifth face 225 opposite the fourth face 224 is connected by an angular sixth vertical face 226 comprised of a first straight portion 227 extending roughly parallel to the fourth face 224, a second arcuate portion 228 which forms an arc of approximately 160° and a third straight elongate portion 229. Thus, the third straight portion 229 and the first face 214 form an angle of approximately 25°.

The Unloader Bar

Referring to FIGS. 3, 17 and 18, positioned along the eleventh face 121 of the central cut-out 106 proximate the cluster gear 176 is a first detent roller arrangement 240. The arrangement 240 includes an elongate first roller arm 242 extending parallel to the receiving end 82 of the housing 50 which is rotatably mounted on a first axle 244 proximate and parallel to the second side wall 88. At the distal end 246 of the first roller arm 242 there is secured a horizontal pin 248 extending toward the back end of the housing about which a disc-shaped first detent roller 250 is rotatably mounted. The first roller arm 242 is biased upward by a helical spring 242a, one end of which is mounted on a post 243a extending horizontally from the roller arm approximately midway between the ends of the roller arm and the other end of the spring 242a is mounted on a hook (not shown) extending from the upper end of the second side wall of the housing. A generally rectangular first tab 244a extends horizontally from the first roller arm 242 opposite the roller pin 248 and spring post 243a slightly distal the spring post.

Similarly, adjacent the corner formed between the second side wall 88 and the receiving end 82 of the housing 50 in a generally rectangular opening formed by the base of the housing is a second detent roller arrangement 260. The second detent roller arrangement 260 is formed by an elongate second roller arm 262 extending parallel to the receiving end 82 of the housing 50 which is rotatably mounted on a second axle 264 coaxial with the first axle 244 which extends parallel to the second side wall 88. At the end of the second roller arm 262 opposite the second axle 264 is a disk-shaped second detent roller 266 rotatably mounted upon a pin 268 proximate and parallel to the second side wall 88. The second roller arm 262 is biased upward by a helical spring 262a, one end of which is mounted on a post 263a extending horizontally from the roller arm 262 approximately midway between the ends of the roller arm and the other end of which is mounted on a hook (not shown) extending from the upper end of the second side wall of the housing. When the respective roller arms are mounted, the spring post 243a of the first roller arm extends toward the back end of the housing and the spring post 243a of the second roller arm 262 extend toward the receiving end of the housing. A generally rectangular second tab 264b extends horizontally from the second roller arm 262 opposite the roller pin 262a and spring post 263a slightly distal the spring post.

Referring to FIGS. 17-18, an unloader bar 264a or device, which is not shown in FIG. 3 for the sake of clarity, is mounted between the first and second detent roller arrangements, 240, 260. The unloader bar 264a has a first end 265a proximate the first detent roller arrangement 240 and a second end 266a proximate the second detent roller arrangement 260. The first end 265a of the unloader bar 264a includes a first elongate side 267a parallel to the first roller arm 242, one end of which defines a bore 268a through which said first axle 244 is slidably extendable. Forming a right angle with the end of the first side 267a opposite the bore 268a is a relatively shorter second side 269a extending opposite the first roller arm 242. Forming an angle of approximately 130 degrees with the end of the second side 269a opposite the first side 267a is an elongate third side 270a which extends away from the first roller arm 242. A fourth side 271a extends downward from the end of the third side 270a opposite the second side 269a at an angle of approximately 45 degrees. An elongate fifth side 272a extends from the end of the fourth side 271a opposite the third side 270a parallel to the first side 267a. Forming a right angle with the end of the fifth side 272a opposite the fourth side 271a is an elongate sixth side 273a which extends parallel to the second side wall of the housing away from the first detent roller arm 242. A seventh elongate side 274a forms a right angle with, and extends toward the second side wall of the housing from, the end of the sixth side 273a opposite the fifth side 272a. An eighth side 275a extends upward from the end of the seventh side 274a opposite the sixth side 273a away from the first detent roller arm 242. A ninth side 276a extends from the end of the eighth side 275a opposite the seventh side 274a. A tenth side 277a extends away from the first side 267a and forms an angle of approximately 130 degrees with the end of the ninth side 276a opposite the eighth side 275a. The end of the tenth side 277a opposite the ninth side 276a forms a right angle with an eleventh side 278a which extends toward the second side wall of the housing is parallel to the first side of the housing and the second detent roller arm 262. At the end of the eleventh side 278a, opposite the tenth side 277a, is formed a bore 279a through which the second axle 264 is slidably rotatable. Thus, it will be appreciated that the first, second, third, ninth, tenth and eleventh sides of the unloader bar are generally coplanar, and that the fifth, sixth and seventh sides of the roller bar are likewise generally coplanar, with the fourth and eighth sides of the unloader bar extending at an angle of 45 degrees between the respective planes.

As shown in FIG. 18, the unloader bar 264a is rotatably mounted by means of the first axle 244 extending through the bore 268a in the end of the first side 267a of the unloader bar 264a, and a second axle 264 extending through the bore 279a in the end of the eleventh side 278a of the unloader bar. Thus mounted, the unloader bar 264a is configured to rotate about the first and second axles, 244, 264, without interference from the eleventh 121, twelfth 122, thirteenth 123, fourteenth 124, fifteenth 125 and sixteenth vertical 126 faces of the cutout 106. As best seen in FIG. 17, the unloader bar 264a is provided with a first flange 280a extending opposite its second side 269a, from its first side 267a. Likewise, the unloader bar 264a is provided with a second flange 281a extending opposite its tenth side 277a from its eleventh side 278a. When the first and second detent roller arrangements and the unloader bar are mounted, the first flange 280a of the unloader bar limits the upward rotation of the first roller arm 242 by resisting the first tab 244a of the first roller arm. Likewise, the second flange 281a of the unloader bar limits the upward rotation of the second roller arm 262 by resisting the second tab 281a of the second roller arm. Although the downward rotation of the unloader bar 264a is limited by the portion of the base extending from the junction between the sixteenth 126 and seventeenth 127 faces of the cutout and the rectangular opening 157a in the base in which the second detent roller and the eleventh side of the unloader bar are mounted, during normal operation the unloader bar does not contact this portion of the base as it is biased upward by the first and second roller arms. As best seen in FIG. 18, the upward rotation of the unloader bar in response to the force exerted by the helical springs of the first and second roller arrangements is limited by the spacer block 356a secured to the underside of the carrier.

The Cartridge Stop

Mounted on the first axle 244 adjacent and generally parallel to the first roller arm 242 opposite the unloader bar 264a is a cartridge stop 282a and a cartridge stop torsion spring 283a. The stop spring 283a includes an elongate first end portion 284a, a coiled central portion 285a, a spacing portion 286a and an elongate second end portion 287a. The first end portion 284a extends downward along the second side wall 88 of the housing. The coiled central portion 285a is mounted around the first axle 244. The spacing portion 286a is angled away from the central portion 285a and, when mounted, the second end portion 287a extends generally perpendicular to the first end portion 284a.

The cartridge stop 282a includes a generally cylindrical mount 288a which defines a bore 289a through which the first axle 244 is rotatably insertable. An angular spacing elbow 290a extends away from the first detent roller arm 242 and upward from the axis of the bore 289a at an angle of approximately 12 degrees, thereby spacing the cartridge stop away from the post 243a of the first roller arm. The elbow 290a is joined to a support arm 291a which extends parallel to the first roller arm 242 and upward from the axis of the bore 289a at an angle of approximately 12 degrees. An angular step 292a is secured to the distal end of the support arm 291a. The step 292a has a generally rectangular vertical section 293a which is secured to the support arm 291a and extends toward the first roller arm 242 therefrom and a generally L-shaped horizontal section 294a having a first portion 295a which extends toward the first roller arm and shares an elongate edge with the vertical section 293a and a second portion 296a which extends outward from the side of the step 292a opposite the first roller arm 242. The side of the vertical section 293a opposite the support arm 291a defines a first engagement surface 293b. A pin 296b is secured to and extends horizontally from the second portion 296a of the L-shaped horizontal surface of the step toward the first roller arm. A first registration roller 297a is rotatably mounted on the pin 296b so that the bottom of the roller 297a extends slightly below the bottom of the horizontal surface 294a of the step 292a and so that the first registration roller 297a is generally co-planar with the first detent roller 250 mounted on the first roller arm 242. Extending opposite the first roller arm 242 from the distal end of the second portion 296a of the horizontal surface of the step upward at an angle of approximately 30 degrees is a cam arm 298a which defines an upper elongate cam surface 299a. At the end of the cam arm 298a distal the step is an elongate horizontal extension 300a. When mounted, the first end 284a of the stop torsion spring is biased against the second side wall 88 of the housing, the coiled portion 285a is flush against the mount 288a of the cartridge stop and the second end portion of the stop torsion spring 287a extends along the edge of the support arm proximate the first roller arm under the vertical surface 293a of the step, so as to bias the distal end of the cartridge stop 282a upward.

The X-Y Table

As discussed above, the x-y table 70 receives the cartridge 20 after it has been inserted through the receiving end 82 and into the housing 50 so that the cartridge rests upon and moves with the x-y table. Referring to FIGS. 4–7, the x-y table 70 is formed by a generally rectangular carrier 270 and a generally rectangular dolly 272 which slidably supports the carrier 270.

The Carrier

As shown in FIG. 1, the carrier 270 is mounted lengthwise within the housing 50 and has a covered end 274 proximate to the back end 90 of the housing 50 and an open end 276 proximate to the receiving end 82 of the housing 50. The carrier 270 includes a generally rectangular planar engagement surface 278 upon which the cartridge 20 rests when the cartridge 20 is inserted into the housing 50 and has a length and width approximately equal to the length and width of the cartridge 20. In the preferred embodiment the engagement surface 278 has a length of approximately 6 inches and a width of approximately 4 inches.

As best seen in FIG. 5, a vertical back wall 280 extends along the covered end 274 of the carrier 270. The end of the vertical back wall 280 proximate the first side wall 86 of the housing 50 forms a right angle with and is connected to a vertical partial side wall 282 which extends roughly one-half the length of the carrier 270. The top of the back wall 280 and the top of the partial side wall 282 are joined by a generally L-shaped cover 284. The cover 284 is formed by a generally rectangular portion 285 at the junction between the back wall 280 and the partial side wall 282, and a thinner elongate portion 286 extending from the rectangular portion 285 opposite the back wall 280 along the partial side wall 282.

Along the side of the carrier 270 opposite the partial side wall 282 and spaced slightly from the open end 276 of the carrier 270 is a raised elongate flange 290. The flange 290 has a height significantly shorter than the partial side wall 282, yet sufficient to prevent movement of the cartridge 20 past the end of the engagement surface 278 when the cartridge 20 rests thereon. A first generally L-shaped notch 292 is formed in the flange side of the carrier 270, extending from beneath the end of the flange 290 proximate the covered end 274 of the carrier 270 to the back wall 280. The first notch 292 is formed by an elongate stem portion 293 extending along the flange side of the carrier 270, and a shorter foot portion 294 extending along the back wall 280 toward the partial side wall 282. A second generally L-shaped notch 296 is positioned opposite the flange 290 in the partial side wall 282 side of the carrier 270 along the open end 276. The second notch 296 is formed by a relatively short stem portion 297 extending along the partial side wall 282 side of the carrier 270 beginning at the end of the partial side wall 292 side proximate the open end 276 and a longer and wider foot portion 298 extending to the open end 276 of the carrier 270. Extending toward the flange side from the foot portion 298 of the second notch 296 is a third rectangular notch 299 spaced slightly toward the closed end 274 of the carrier 270 from the open end 276.

Extending perpendicularly outward from the back wall 280 proximate the partial side wall 282 is a horizontal shelf 302 which supports the microswitch 74 (FIG. 1).

Extending horizontally roughly half the length of the back wall 280 is a housing 31? for the door opening mechanism 360. The housing 310 is formed by a generally rectangular top plate 312, which extends in the same plane as the cover 284, partially overhanging the engagement surface 278 on the open end side of the back wall 280 and extend rearwardly past the closed end side of the back wall 280. The other half of the housing 310 is formed by a bottom plate 314 extending horizontally rearward from the back wall 280 parallel to the top plate 312. In addition, an arm 316 extends outward from the back wall 280 parallel to, and approximately halfway between, the top plate 312 and bottom plate 314 slightly beyond the outer edge of the top plate 312. The top plate 312 and bottom plate 314 are spaced from the shelf 302 and the backstop 304 so as to form a channel 318 therebetween. The channel 318 is sufficiently wide that the T-shaped flange 156 extending from the back end 90 of the tape drive housing 50 can be loosely slid in and out of the channel 318.

Figure 7:
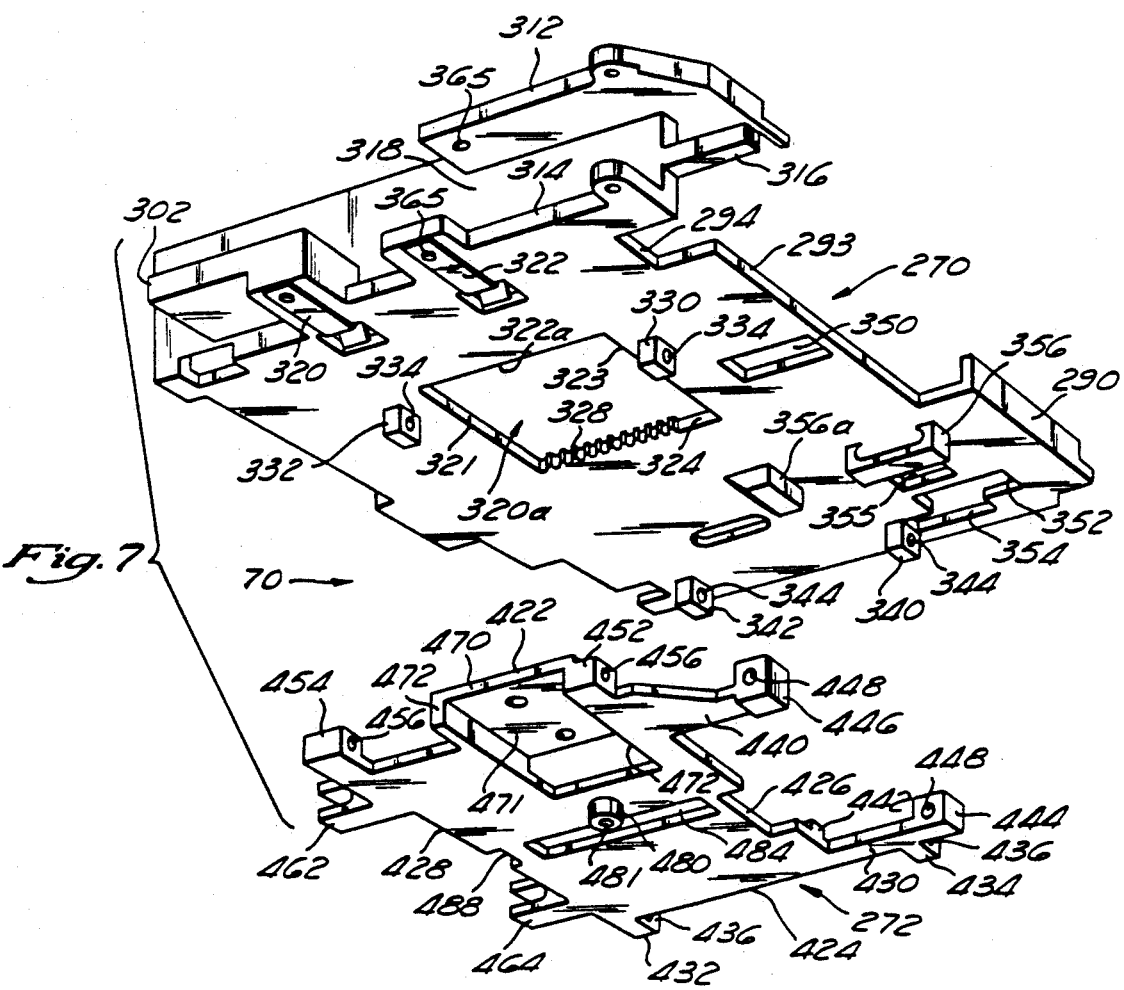
FIG. 7 is an exploded bottom perspective view of the x-y table of FIG. 4.

Referring now to FIG. 7, at the covered end 274 of the carrier 270 are a pair of leaf springs 320, 322 extending parallel to the partial side wall 282 and through mating apertures in the carrier 70 proximate the back wall 280. One leaf spring 320 is secured beneath the side of the shelf 302 distal the partial side wall 282 and the other 322 is secured to the bottom plate 314 of the door-opening mechanism 360 proximate the partial side wall 282.

In approximately the center of the carrier 270 is a rectangular first cut-out 320a having vertical edges 321, 322a, 323, 324 which are generally parallel to the sides and ends of the carrier. The edge of the first cut-out 324 parallel and proximate to the open end 276 of the carrier 270 forms a rack of vertically extending teeth 328. On either side of the first cut-out are a first set of depending mounting blocks 330, 332, each of which defines a horizontal bore 334 parallel to the open end 276 of the carrier 270. Located parallel to the first set of mounting blocks 330, 332 along the open end 276 of the carrier 270 is a second set of depending mounting blocks 340, 342, each of which defines a horizontal bore 344 parallel to the open end 276 of the carrier 270. Between the first cut-out 320 and the flange side 290 of the carrier 270 located approximately midway between the ends of the first cut-out is a smaller generally rectangular second cut-out 350 having relatively short sides and longer ends. At the corner between the open end 276 of the carrier 270 and the flange side of the carrier 270 parallel to and aligned with the second cut-out 350 is a rectangular third cut-out 352. The end of the third cutout 352 proximate the open end 276 of the carrier 270 is partially shared by a generally rectangular fourth cutout 354, which is offset from the third cutout 352 toward the partial side wall 282 side of the carrier 270. A generally rectangular fifth cutout 355 is positioned adjacent and parallel to the third cutout 352 opposite the fourth cutout 354. A generally rectangular guide holder is positioned adjacent to the fifth cutout 355 opposite the third cutout 352. The guide holder 356 defines a channel which is parallel to and aligned with the second 350 and the third cutout 352. A generally rectangular spacing block 356a is positioned roughly midway between the side 323 of the first rectangular cutout 320a proximate the flange side of the carrier and the open end of the carrier.

The Door Opening Mechanism

Figure 6:
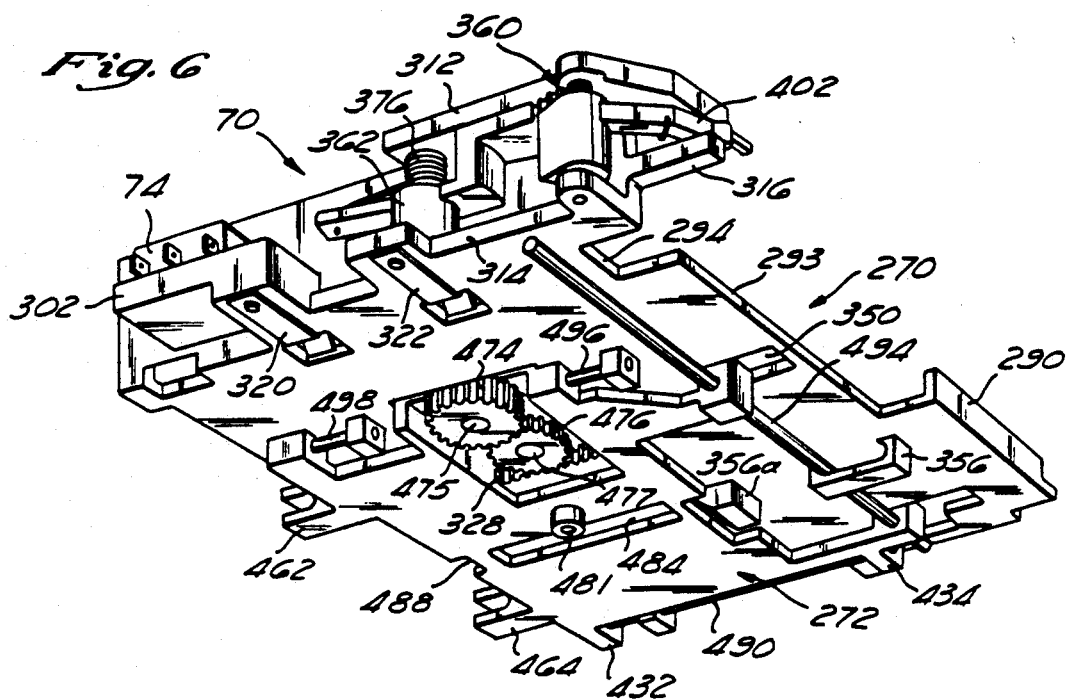
FIG. 6 is a bottom perspective view of the x-y table of FIG. 4.
Figure 8:
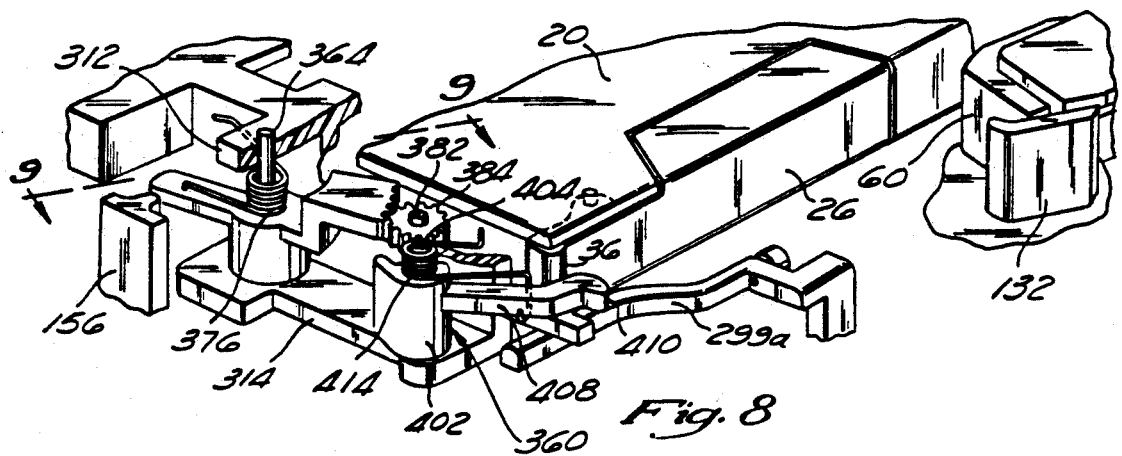
FIG. 8 is an enlarged partially cut-away perspective view of the door opening mechanism of the tape drive of FIG. 1.
Figure 9:
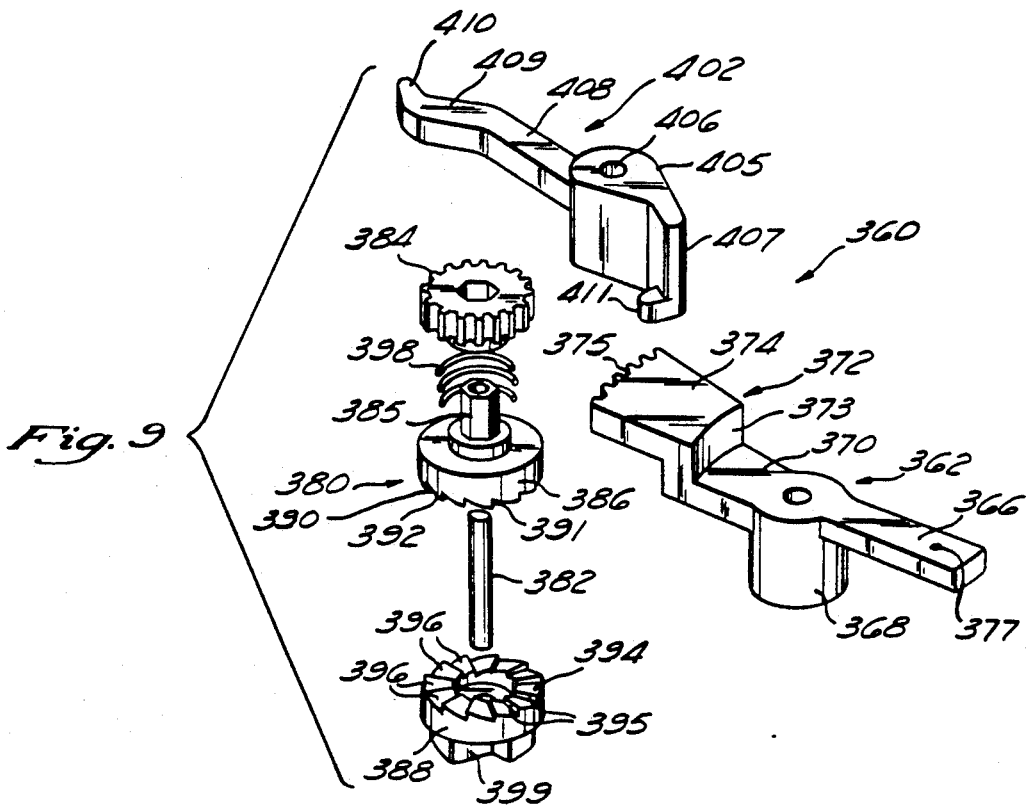
FIG. 9 is an exploded perspective view of the door opening mechanism of FIG. 8.

As best seen in FIGS. 6, 8 and 9, the door opening mechanism 360 is mounted between the top plate 312 and bottom plate 314 on the covered end 274 side of the back wall 280 of the carrier 270. The mechanism 360 includes an elongate drive arm 362 rotatably mounted between the top and bottom plates 312,314 of the housing 310 at the end of the housing 50 proximate the partial side wall 282 of the carrier 270 by means of a pivot pin 364 which extends vertically through a pair of corresponding apertures 364 in the plates 312,314.

The drive arm 362 includes a generally rectangular receiving portion 366, a cylindrical body portion 368 connected to the receiving portion 366, an elongate drive portion 370 extending from the body portion 368 and a generally L-shaped flange portion 372 extending from the drive portion 370. The receiving portion 366 and the drive portion 370 are coplanar with the top of the body portion 368, while the flange portion 372 is formed from a foot portion 373 which extends upward from the end of the drive portion 370 opposite the body portion 368 and a longer stem portion 374 which forms a right angle with the end of the foot portion 373 opposite the drive portion 370. Thus, it will be appreciated that the flange portion 372 extends parallel to the receiving portion 366 and the drive portion 370. The end of the flange portion 372 opposite the drive portion 370 forms a set of vertically extending teeth 375.

The drive arm 362 is rotatably mounted between the top plate 312 and the bottom plate 314 by means of the pivot pin 364 which extends through a mating bore in the body portion 368 of the drive arm 362. A torsion drive arm spring 376 mounted around the pivot pin 364 between the top of the body portion 368 of the drive arm 362 and the top plate 312 biases the receiving portion 366 of the drive arm 362 away from the back wall 280 of the carrier 270 and the flange portion 372 of the drive arm 362 toward the back wall 280. As shown in FIG. 4, the lower end of the drive arm spring 376 is secured within an aperture 377 in the receiving portion 366 of the drive arm 362 and the upper end is braced against the end of the top plate 312 proximate the partial side wall 282.

Figure 10:
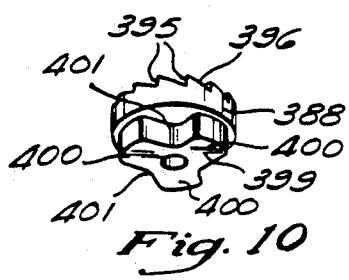
FIG. 10 is an enlarged bottom perspective view of the lower ratchet of the door opening mechanism of FIG. 8.

The teeth 375 of the flange portion 372 of the drive arm 362 drive a ratchet 380. The ratchet 380 is mounted on a pivot pin 382 which extends through the top plate 312 and bottom plate 314 of the mechanism housing 310. The ratchet 380 includes a ratchet drive gear 384 which is mounted over a hexagonal shaft 385 surrounding the pivot pin 382 and extending perpendicularly from the center of a generally disc-shaped upper ratchet 386. The upper ratchet 386 is mounted above a cooperating disc-shaped lower ratchet 388. The mating portions of the upper ratchet 386 and lower ratchet 388 comprise a pair of mating sets of serrated teeth 390, 394 which permit movement of the upper ratchet 386 in a clockwise direction relative to the lower ratchet 388 but prevent movement of the upper ratchet 386 in a counter-clockwise direction relative to the lower ratchet 388. Specifically, the teeth 390 of the upper ratchet 386 include clockwise facing (as shown in FIG. 9) generally vertical faces 391 and counter-clockwise facing inclined ramps 392 and the teeth 394 of the lower ratchet 388 include counter-clockwise facing vertical faces 395 and clockwise facing inclined ramps 396. Surrounding the hex shaft 385 between the ratchet drive gear 384 and the upper ratchet 386 is a ratchet spring 398, which biases the upper ratchet 386 toward the lower ratchet 388 maintaining contact between their respective mating teeth 390, 394. As best seen in FIG. 10, the bottom of the lower ratchet 388 forms a generally triangular annulus 399 having three peaks 400 positioned 120 degrees from one another, each of which is separated from the other by a valley 401.

Mounted proximate the pivot pin 382 for the ratchet drive gear 384 distal to the back wall 280, is a leg, or lever 402, rotatably mounted upon a vertical pivot pin 404 which extends through both the bottom plate 314 and the top plate 312 of the mechanism housing 310. The leg 402 has a generally cylindrical body portion 405 in which is formed a bore 406 through which the pivot pin extends, a vertical flange portion 407 tangential to the side of the cylindrical portion 405, a main leg portion 408 extending from the body portion 405 and forming an angle of approximately 45° with the vertical flange portion 407, a foot portion 409 extending from the main leg portion 408 at an angle of about 45 degrees, thus forming an angle of approximately 90 degrees with the flange portion 407, and a toe portion 410 extending outward away from the vertical flange portion 407 forming an included angle with the foot portion 409 of approximately 135°. The leg 408 further includes a node 411 which protrudes from the bottom of the flange portion 407 parallel to the radius of the body portion 405. It will be appreciated that the height of the node 411 is less than that of the annulus 399 of the lower ratchet 388 so that the primary contact between the lower ratchet 388 and the node 411 is between the peaks 400 and valleys 401 of the annulus 399. As shown in FIGS. 6 and 8, a torsion leg spring 414 is mounted between the body portion 405 of the leg 402 and the upper plate 312. One end of the leg spring 414 is anchored to the upper plate 312 while the other end is braced against the main leg portion 408 of the leg 402 to bias the leg 402 in a counter-clockwise direction. Accordingly, the leg 402 rotates about the pivot 404 until its rotation is prevented due to the resistance caused by contact between either the node 411 and a valley 401 of the annulus 399, or the node 411 and a peak 400.

The Dolly

Referring to FIGS. 5, 6 and 7, the dolly 272 of the x-y carrier 70 will now be described in greater detail. The dolly 272 has a generally elongate rectangular configuration with a drive end 422 corresponding to the covered end 274 of the carrier 270 and a support end 424 corresponding to the open end 276 of the carrier 270. Likewise, the dolly 272 has a head side 426, corresponding to the flange 290 side of the carrier 270 and an outer side 428 corresponding to the partial side wall 282 side of the carrier 270. At the corner of the dolly 272 between the support end 424 and the head side 426 is a first elongate horizontal brace 430. Proximate the distal side of the brace 430 and located at the corner of the support end 424 and the outer side 428 are a first set of receiving blocks 432,434, each of which include a horizontal bore 436 extending parallel to the support end 424. At the corner of the dolly 272 between the drive end 422 and the head side 426 is a second, generally triangular, brace 440 spaced slightly inward from the drive end 422 of the dolly 272 and extending parallel to the drive end 422. At the corner between the head side 426 and the support end 424 of the brace 430 proximate the first brace 430 is a raised rectangular block 442 extending parallel to the support end 424 of the dolly 272. At the distal side of the first brace 430 and second brace 440 are a second set of receiving blocks 444,446, each of which include a horizontal bore 448 extending parallel to the head side 426 of the dolly 272. At each corner of the drive end 422 of the dolly 272 are a third set of receiving blocks 452,454, each of which include a horizontal bore 456 extending parallel to the drive end 422. In addition, extending from the outer side 428 of the dolly 272, spaced slightly inward from the drive end 422 and the support end 424, respectively are a pair of C-shaped flanges 462,464. Each flange extends so that its open side extends outward from the outer side 428 of the dolly 272.

At the drive end 422 of the dolly 272 positioned just inward from the corner between the drive end 422 and the head side 426 of the dolly 272 is a drive housing 470 for the carrier drive. The housing 470 is formed by a generally rectangular plate 471 having a depending flange 472 on either side which is integrally formed with the dolly 272. As illustrated in FIGS. 5 and 6, a transition gear 474 is mounted within the drive end 422 of the cutout by means of a vertical pin 475 secured to the housing 470. The transition gear 474 is positioned in meshing engagement with a drive gear 476 which is rotatably mounted on a pivot pin 477 extending through the drive housing 470. Proximate the support end 424 of the dolly 272 is a depending cylindrical receptacle 480. The receptacle 480 defines a vertical bore 481 for rotatably receiving the stud 212 of the link 204 when the carrier 270 and dolly 272 are assembled. Proximate the receptacle 480, opposite the drive housing 470 is an elongate slot 484 which extends parallel to the support end 424 of the dolly 272. At the side of the slot 484, proximate the outer side 428 of the dolly 272 is an L-shaped flange 486 which overhangs a generally rectangular notch 488.

Referring now to FIGS. 4 and 6, in its assembled state, the dolly 272 is positioned beneath the carrier 270 so that the drive housing 470 of the dolly 272 extends through the central cutout 106 of the carrier 270, so that the vertical teeth of the drive gear 476 engage the teeth 328 of the carrier 270. The support end 424 of the dolly 272 is secured to the underside of the open end 276 of the carrier 270 by means of an elongate first guide, or rod 490, extending through the first set of receiving blocks 432, 434 of the dolly 272 and the second set of mounting blocks 340, 342 of the carrier 270, so as to be parallel to the open end 276 of the carrier 270. Likewise, the second set of receiving blocks 444, 446 of the dolly 272 are secured within the second, third and fourth elongate cutouts 350, 352, 354 of the carrier 270, respectively, by a second elongate guide, or a rod 494, which is slidably received by the bore 448 of the second set of receiving blocks 444, 446, and through the guide holder 356 so as to be parallel to the flange 290 side of the carrier 270. This secures the head side 426 of the dolly 272 to the underside of the flange 290 side of the carrier 270 by means of the second elongate guide, or rod 494. In addition, the drive end 422 of the dolly 272 is slidably secured to the carrier 270 proximate the covered end 274 of the carrier 270 by means of a pair of horizontal guides, or rods 496, 498, extending through the first set of mounting blocks 330, 332 of the carrier 270 and the third set of receiving blocks 452, 454 of the dolly 272 parallel to the covered end 274 of the carrier 270. Since the second set of receiving blocks 444, 446 are secured within the second and third cutouts 350, 352 by means of the guide holder 356 and channel, it will be appreciated that this mounting arrangement permits movement of the carrier 270 relative to the dolly 272 in a direction parallel to the ends of the dolly 422, 424, but prevents movement of the dolly in a direction parallel to the sides of the dolly 426, 428.

As shown in FIG. 1, when the x-y table 70 is mounted within the housing 50, the stud 212 extending upward from the first end 205 of the link 204 is rotatable retained by the depending receptacle 480 of the dolly 272 and the C-shaped flanges 462, 464 on the outer side 428 of the dolly 272 slidably receive the differential rod 192. This permits the flanges 462, 464 to slide along the differential rod 192, as the second set of receiving blocks 444, 446 slide along the second guide 494. Thus mounted, the x-y table 70 can slide between the ends of the tape drive housing 50 parallel to the housing sides in response to movement of the link 204. Further, although the dolly 272 is fixed against movement parallel to the ends of the tape drive 10, the carrier 270 can be moved parallel to the ends of the tape drive 10 for purposes of bringing a cartridge 20 resting on the x-y table 70 into the read/write position against the tape head 60. Thus, the gear assembly 170, the link 204, and the carrier drive form a table drive for moving the x-y table 70 in the x-y plane.

The Head Positioning Assembly

Figure 13:
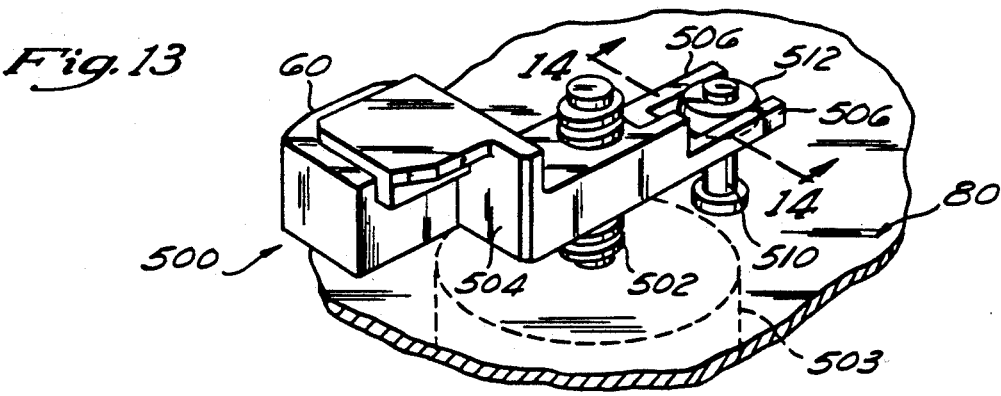
FIG. 13 is a partially cut-away perspective view of the magnetic head carriage of the tape drive of FIG. 1.
Figure 14:
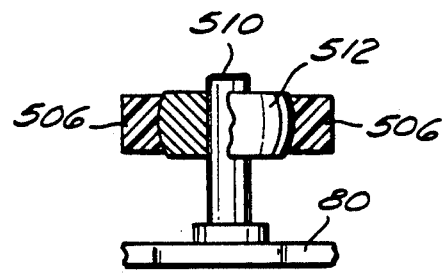
FIG. 14 is a top perspective view of the carriage of FIG. 13.

FIGS. 13-14 show the magnetic head 60 for engaging a length of magnetic tape 44 within the access 24. The head 60 is mounted on the head positioning apparatus 500 which enables the head 60 to move transversely across the tape 44 so that multiple tracks of data may be recorded on the tape 44, but fixes the head in the x-y plane.

The head 60 is moved by the rotation of a lead screw 502 which has external threading. The lead screw 502 is rotated by a stepper motor 503 which in turn is mounted within the head assembly aperture of the tape drive 10. The head positioning apparatus 500 is very similar to the "half-nut" head positioning apparatus disclosed in U.S. Pat. No. 4,747,004 entitled "Magnetic Head Positioning Apparatus," which patent is hereby incorporated by reference, with one significant exception, described below.

The head 60 is mounted at one end of a carriage 504. The other end of the carriage 504 terminates in a pair of alignment arms 506. A stationary cylindrical post 510 extends upwardly from the tape drive housing 50 and passes through a metal bushing 512 secured within a slot 513 between, and formed by, the alignment arms 506. As best seen in FIG. 13, the sides of the bushing 512 define a radius so that the top and bottom of the bushing 512 taper inwardly from the middle of the bushing 512. Likewise, the sides of the alignment arms 506 defining the slot 513 define a slightly larger inverted radius. As will be appreciated, this permits the bushing 512 to incline slightly within the cavity 513, so as to compensate for any inaccuracies in the vertical alignment of the post 510. On the other hand, the bushing 512 prevents any rotational movement by the carriage 504 about the axis of the lead screw 502. As the carriage body 504 is desirably made from plastic, to minimize cost, the use of a bushing 512, which is preferably made of porous bronze can be fabricated to much higher tolerances than the plastic housing, thereby permitting the position of the head to be precisely controlled in an inexpensive manner.

The Operation

The operation of the tape drive 10 will now be described. Referring to FIG. 1, the x-y table 70 is movable in an x-y plane in an x-y-z coordinate system. The slot 84 defines the x, y and z axes. The x axis is defined by the bottom edge of the slot 84. The z axis extends perpendicular to the x axis from the bottom corner of the slot 84 proximate the first side wall 86 along the junction between the first side wall 86 and the receiving end 82 of the housing 50, so that the receiving end 82 of the housing 50 is in the x-z plane. The y axis is orthogonal to both the x axis and z axis and extends from the bottom corner of the slot 84 proximate the first side wall 86 and the receiving end 82 of the housing 50, parallel to the first side wall 86 of the housing 50. Thus, the engagement surface 278 of the x-y table 70 is in the x-y plane.

It will be appreciated, that although it will generally be desirable to provide the housing with an integral receiving end which forms a slot, it would be possible for the bezel secured at the receiving end of the housing to form the slot through which the access end of the cartridge can be inserted. The slot of the bezel would then define the coordinate system. Specifically, the x axis would defined by the bottom edge of the bezel slot. The z axis would extend perpendicular to the x axis from the bottom corner of the slot proximate the first side wall corresponding to the junction between the first side wall and the receiving end 82 of the housing 50, so that the bezel, and normally, the receiving end 82 of the housing 50 would be in the x-z plane. The y axis would again be orthogonal to both the x axis and z axis and extend from the bottom corner of the slot proximate the first side wall 86 and the receiving end 82 of the housing 50, parallel to the first side wall 86 of the housing 50.

Referring now to FIG. 12a, the hinge end 32 of the cartridge 20 is positioned proximate the slot 84 in the receiving end 82 of the housing 50 and is aligned therewith. The cartridge 20 is moved in the y direction along the engagement surface 278 of the carrier 270 so that the hinge end 32 of the cartridge 20 slides beneath the cover 284 of the carrier 270 and the upper plate 312 of the mechanism housing 310. When the hinge end 32 of the cartridge 20 reaches the back wall 280 of the carrier 270, it depresses the microswitch 74 located on the shelf 302.

In this initial position, before the microswitch 74 is activated, the main gear 180 and the link 204 are in the position shown in FIG. 12a. That is, the link 204 extends essentially perpendicular to the receiving end 82 of the housing 50, with the second hook 230 of the link 204 engaging the first lip 107 of the central cutout 106 of the housing 50 and the pivot pin 202 secured to the main gear 180 positioned at the first end 209 of the opening 208 proximate the first end 205 of the link 204. In this position, the drive arm spring 376 biases the flange portion 372 of the drive arm 362 against the back wall 280 of the carrier 270. The teeth 375 of the flange portion 372 of the drive arm 362 opposite the back wall 280 are in meshing engagement with the ratchet drive gear 384. The leg spring 414 biases the node 411 extending from the bottom of the flange portion 407 of the leg 402 against a valley 401 of the annulus 399, so that the leg 402 is spaced away from and provides no pressure to the access door 26. Accordingly, the springed door 26 of the cartridge 20 is held in its closed position by the bias of its self-contained spring.

Referring now to FIG. 12b, after the actuation of the microswitch 74, the stepper motor 172 is actuated causing the motor pinion 174 to rotate in a counter-clockwise direction. As the teeth of the motor pinion 174 are in meshing engagement with the lower gear 176a of the cluster gear 176, the cluster gear 176 is rotated in a clockwise direction. The upper gear 176b of the cluster gear 176, in turn, is in meshing engagement with and rotates the idler gear 178 in a counter-clockwise direction. The idler gear 178 is in meshing engagement with the main gear 180 and rotates the main gear 180 in a clockwise direction.

The clockwise rotation of the main gear 180, as shown in FIGS. 12a–12d, causes the link 204 to rotate about the stud 212 in a counter-clockwise direction, so that the second hook 230 of the link 204 releases the first lip 107 of the central cutout 106 of the housing 50. As the gear 180 continues its rotation, the stud 212 extending upward from the second end 207 of the link 204 pulls the x-y table 70 toward the back end 280 of the housing 50.

Referring now to FIG. 8, as the x-y table 70 moves toward the back end 90 of the housing, the arm 316 at the corner of the back wall of the carrier extending toward the second wall of the housing contacts the cam surface 299a cam arm 298a of the cartridge stop 282a. As the x-y table continues to move toward the back end of the housing, the arm 316 of the carrier moves along the length of the cam surface 299a, overcoming the bias of the stop torsion spring 283a and forcing the cartridge stop 282a gradually downward. As shown in FIG. 8, as the x-y table nears the back end of the housing, the arm 316 of the carrier contacts the extension 300a of the cartridge stop, holding the cartridge stop in its fully lowered position.

At a point just before the position shown in FIG. 12b, the resistance of the T-shaped flange 156 to the pressure exerted against it by the receiving portion 366 of the drive arm 362 as the x-y table 70 moves toward the back end 280 of the housing 50 overcomes the bias of the drive arm spring 376 and rotates the drive arm 362 in a clockwise direction. This causes the flange portion 372 of the drive arm 362 to rotate the ratchet drive gear 384 in a counter-clockwise direction. The clockwise facing vertical face 391 of the serrated teeth 390 of the upper gear 386 of the ratchet 380 drive against the counter-clockwise facing vertical faces 395 of the teeth 394 of the lower gear 388 causing the lower ratchet gear 388 to rotate counter-clockwise. This causes the peak 400 of the annulus 399 to push against the node 411 of the leg 402 overcoming the bias of the leg spring 414 against the node 411 and causing the leg 402 to rotate in a counter-clockwise direction until the node 411 is positioned against the top of one of the peaks 400 of the annulus 399. The force with which the leg 402 rotates is also sufficient to force the foot 409 of the leg 402 against the flange 36 of the access door 26 of the cartridge 20 overcoming the bias of the door spring of the cartridge 20, thereby causing the door 26 to open. It is significant that the cartridge stop is moved out of the way of the access door, thereby permitting the door to open freely.

Further rotation of the main gear 180 causes the stud 212 of the link 204 to push the x-y table 70 in the opposite direction along the y axis toward the receiving end 82 of the housing 50, releasing the force of the T-flange 156 against the drive arm 362, and allowing the bias of the drive arm spring 376 to rotate the drive arm 362 in a counter-clockwise direction forcing the flange portion 372 of the drive arm 362 against the ratchet drive gear 384. This rotates the drive gear 476 in a clockwise direction forcing the ramps 392 of the serrated teeth 390 of the upper ratchet 386 against the ramps 396 of the serrated teeth 394 of the lower ratchet 394. Due to the angle of the respective ramps 392, 396, the clockwise rotation of the upper ratchet 386 causes the upper ratchet 386 to slide upward, overcoming the bias of the ratchet spring 398, and permitting the upper ratchet 386 and lower ratchet 388 to rotate relative to one another. As a result the lower ratchet 388 does not rotate and the door 26 remains held in its open position. In addition, as the partially open door 26 contacts the head guard 132, the movement of the cartridge 20 in the x direction toward the receiving end 82 of the housing 50 fully opens the door 26, thereby ensuring that there will be sufficient room for the head 60 to operatively engage the length of tape 44 within the access 24.

As the x-y table moves toward the receiving end of the housing, the arm 316 at the corner between the back wall of the carrier slides along the extension 300a of the cartridge stop 282a toward the cam arm 298a of the cartridge stop. As the forward movement of the x-y table 70 continues, the arm 316 of the carrier slides along the cam surface 299a of the cartridge stop, gradually releasing the force exerted on the distal end of the stop 282a and allowing the stop spring 283a to lift the cartridge stop 282a upward until the first registration roller 297a mounted on the cartridge stop is spaced in the z direction slightly above the base plate 21 of the cartridge.

As shown in FIG. 12c, once the main gear 180 completes approximately three quarters of its clockwise rotation, the first hook 107 of the link 204 engages the second lip 230 of the central cutout 106 of the housing 50, preventing movement of the link 204 and, therefore, the x-y carrier 70 in the y direction. At this point, the rack 184 secured to the main gear 180 engages the transition gear 474 of the dolly 272 causing the gear 474 to rotate in a counterclockwise direction, which, in turn, rotates the drive gear 476 in a clockwise direction. As the teeth of the drive gear 476 are in meshing engagement with the teeth 328 of the carrier 270 (FIG. 6) and the dolly 272 is fixed against movement in the x direction, this rotation drives the carrier 270 in the x direction toward the magnetic read/write head 60 of the tape drive 10 proximate the second side wall 88 of the housing 50.

As shown in FIGS. 12c-d, the opening 208 in the link 204 is curved toward the second face 216 of the link 204 as the opening 208 extends from its first end 209 to its second end 210 along a radius generally conforming to the distance of the opening 208 from the pivot pin 202 of the main gear 180. Thus, although the link 204 is prevented from further movement after the second lip 108 engages the first hook 220, the link 204 does not prevent further clockwise rotation of the main gear 180, since the pivot pin 202 within the opening 208 is able to slide from the first end 209 to the second end 210 of the opening 208 along its natural arc of rotation. As shown in FIG. 12d, when the pivot pin 202 contacts the second end 210 of the opening 209 preventing further clockwise rotation of the main gear 180, the magnetic head 60 is in contact with the length of tape 44 within the access 24.

As the length of tape 44 within the access 24 contacts the head, the base plate of the cartridge is registered, as required by ANSI standards, by five registration surfaces. The first registration surface (not shown) is located at the base of the open end side of the back wall of the carrier and simply constitutes the lower surface of a short ledge which extends over the access end of the base plate just enough to firmly secure the access end of the base plate 25 beneath the registration surface. During the movement of the x-y table along the y axis, the spacer block 356a secured to the bottom of the carrier spaces the unloader bar 264a downward away from the carrier, preventing the detent rollers 250, 266 from interfering with the movement of the x-y table. However, as best seen in FIGS. 19a-19b, as the x-y table moves in the x direction toward the second side wall of the housing, the block 356a slides relative to the sixth side 273a of the unloader bar, allowing the springs 242a, 262a of the first and second roller arms to raise the arms 242, 262 upward so that the detent rollers 250, 266 engage the detents 21 in the hinge end and the closed end of the base plate 25. Referring to FIGS. 21 and 22, the first detent roller 250 forces the base plate 21 of the cartridge upward in the z direction so that the first registration roller 297a registers against the top of the base plate 25 to act as the second registration surface, and inward in the x direction against the first engagement surface 293b so that the first engagement surface 293b registers against the access side of the base plate 25 to act as the third registration surface. As will be appreciated, registration is this manner is only achieved when the access door 26 of the cartridge is open, as otherwise the flange 36 of the door would prevent the first registration roller 297a from contacting the upper surface of the base plate 25. Likewise, the second detent roller 266 forces the base plate 21 of the cartridge upward in the z direction so that the second registration roller 115a registers against the top of the base plate 25 to act as the fourth registration surface, and inward in the x direction against the second engagement surface 112b, so that the second engagement surface 112b registers against the access side of the base plate 25 to act as the fifth registration surface.

Finally, as shown in FIG. 23 and 23a, the tape drive may advantageously be provided with a pivotable capstan drive motor 600 having a capstan drive wheel 602 secured to a pair of mounts 104b on either side of the capstan drive motor opening 104c in the second side wall 88. Although the drive motor 600 may be mounted in a variety of ways, the drive motor desirably is provided with a pair of outward extending pins 601 which can be rotatably supported within the bores of a pair of rectangular mounting blocks (not shown) secured to the mounts 104b. To ensure that the capstan drive wheel 602 presses against the capstan roller 42 with sufficient force to generate enough friction to drive the spools of tape within the cartridge, the side of the motor 600 proximate the second side wall 88 is preferably biased downward by a spring 605 secured at one end to the motor and at the other end to the housing. Thus, the spring will rotate the motor downward toward the second side wall until the rotation of the motor is prevented by the force of the second side wall against the housing. When the cartridge approaches contact with the head, however, the capstan of the cartridge will press against the capstan drive wheel of the motor overcoming the bias of the spring and rotating the motor until it is parallel to the x-y plane. Desirably, the motor is a 12 volt DC brushless motor with a maximum operating speed of 4970 RPM and a maximum external torque load of 2.4 ounce-inches per amp and has a generally cylindrical body with a diameter of approximately 2.18 inches and a capstan drive wheel with a diameter of approximately 0.625 inches. As best seen in FIG. 23a, the side of the motor body closest the second side wall and the side of the motor body opposite thereto are flattened so that the motor body has a width of approximately 2.0 inches at this point. This flattening permits a capstan drive of larger diameter to be used to drive the capstan of the cartridge, than would normally be possible with a cylindrical motor of similar power.

When the cartridge 20 is to be ejected from the tape drive 10, the polarity of the stepper motor 172 is reversed, causing the main gear 180 to rotate in a counterclockwise direction, as shown in FIGS. 12a–12d, thereby causing the transition gear 474 to move in a clockwise direction, and the drive gear 476 to move in a counterclockwise direction, driving the carrier 270 opposite its original path in the x direction toward the first side wall 86 of the housing 50. When the main gear 180 has completed roughly a one-quarter revolution of counter-clockwise rotation, as shown in FIG. 12c, the rack 184 mounted on the main gear 180 disengages from the transition gear 474, thereby stopping further movement of the carrier 270 relative to the dolly 272 in the y direction. Further counter-clockwise rotation of the main gear 180 causes the pivot pin 202 of the main gear 180 to press against the first end 209 of the link opening 208, causing the link 204 to disengage its first hook 220 from the second lip of the central cutout 106. Further rotation of the main gear 180 in a counterclockwise direction pulls the link 204, and therefore the x-y table, toward the back end 90 of the housing 50, where receiving end 366 of the drive arm 362 of the door opening mechanism 360 presses against the T-shaped flange 156. This rotation drives the flange portion 372 of the drive arm 362 against the ratchet drive gear 384, causing the counter-clockwise rotation of the drive gear 384 and the counter-clockwise rotation of the upper and lower ratchet 386, 388. Since the node 411 of the foot 409 is initially positioned at the top of one of the peaks 400 of the annulus 399, this further rotation of the annulus 399 aligns the node 411 of the foot 409 with a valley 401 on the annulus 399 releasing the resistance of the annulus 399 against the leg spring 414. This, in turn, permits the leg spring 414 to rotate the leg 402 in a clockwise direction, releasing the resistance of the foot portion 409 of the leg 402 on the flange 36 of the door 26 of the cartridge 20, so that the self-contained door biasing spring of the cartridge 20 closes the access door 26.

Finally, as shown in FIG. 12a, further counter-clockwise rotation of the main gear 180 forces the link 204, and, therefore, the x-y table 70 in the y direction toward the receiving end 82 of the housing 50.

In the event of a power failure or drive malfunction, the cartridge can be manually ejected from the tape drive. As best seen in FIG. 15, the hexagonal shaft 199 of the key 198a can be inserted into the coaxial hexagonal bore 197 in the end of the guide 192 at the receiving end 82 of the housing 50. By manually rotating the key 198a, the guide 192, the differential and, therefore, the main gear 180 can also be rotated. The rotation of the main gear 180 results in the operation of the drive in the same manner as discussed above in connection with the operation of the drive by means of the actuation of the stepper motor 172.

The tape drive of the present invention provides a simple, reliable compact end loaded stationary head tape drive, particularly adapted for use with standard ¼-inch tape drive cartridges.

We claim:

1. A drive for an elongate, rectangular tape cartridge having a pair of sides and a pair of ends which are shorter than said sides, said cartridge enclosing a length of tape and including a door in one of said sides proximate one of said ends for providing access to said length of tape, said cartridge further comprising a base plate, said drive comprising:

an elongate housing having one end which forms a slot sized and shaped to receive said cartridge when said cartridge is aligned with said ends of said cartridge parallel to said slot;

a magnetic head;

a mechanism for opening said door of said cartridge sufficiently to provide access to said length of tape by said head; and an elongate table mounted within said housing upon which said cartridge may rest, said table having a pair of ends being movable linearly in a direction substantially parallel to an x axis and also movable linearly in a direction substantially parallel to a y axis, wherein said x axis and said y axis intersect and are perpendicular to one another and movement of said pair of ends of said table in the x direction bringing said length of tape into a read/write position relative to said head when said door opening mechanism has been actuated, wherein said magnetic head is fixed against movement in a plane defined by and containing said x axis and said y axis, wherein said plane has an orientation with respect to said drive and movement of said table is contained within said plane;

a motor for moving said length of tape within said cartridge along said magnetic head when said head is in a read/write position with said length of tape; and a stop rotatably mounted to said housing which engages said cartridge base plate proximate said door for registering at least one surface of said base plate of said cartridge relative to said magnetic head after the opening of said door by said door opening mechanism, said stop being rotatable away from said table in response to movement of said table to avoid interference with the opening of said door by said door opening mechanism.

2. The drive of claim 1, further comprising an additional motor and an assembly connected to said additional motor and said table for automatically moving said table in response to the at least partial insertion of said cartridge through said slot.

3. The drive of claim 1, further comprising a manual ejection mechanism for at least partially ejecting said cartridge from said drive.

4. The drive of claim 1, wherein said magnetic head is movable along a z axis, said z axis being orthogonal to said x axis and said y axis, the range of movement of said magnetic head along said z axis being limited to positions corresponding to different tracks on said length of tape.

5. The drive of claim 1, wherein said stop registers at least two surfaces of said base plate proximate said door.

6. The drive of claim 5, wherein said table further comprises means for initiating said rotation of said stop.

7. The drive of claim 5, wherein said base plate further comprises a detent at each end, said drive further comprising an arrangement for interacting with at least one of said detents to bias said base plate against said stop.

8. The drive of claim 7, further comprising a device for overcoming the bias of said arrangement while said table moves along said y axis to prevent said arrangement from interfering with the movement of said table along the y axis.

9. The drive of claim 1 wherein said table is contained entirely within said housing.

10. A drive for an elongate, rectangular tape cartridge having a pair of sides and a pair of ends which are shorter than said sides, said cartridge enclosing a length of tape and including a door in one of said sides for providing access to said length of tape, said drive comprising:
- an elongate housing having one end which forms an elongate slot which extends longitudinally in a direction substantially parallel to an x axis, said slot formed in a plane defined by said x axis and a z axis, a y axis defining direction extending through said slot, said axes being mutually orthogonal so as to define a coordinate system, with said housing end extending in a x-z plane including said x axis and said z axis, said slot sized and shaped to receive one of said ends of said cartridge when said cartridge is aligned with said slot in said x-z plane and is inserted through said slot in a direction substantially parallel to said y-axis in an x-y plane including said x axis and said y axis;
- a magnetic head;
- a mechanism for opening said door of said cartridge sufficiently to provide access to said length of tape by said head;
- an elongate first guide mounted at least partially within said housing so that its length extends in a direction substantially parallel to said y axis;
- a dolly slidably supported by said first guide so as to be slidable in said direction substantially parallel to said y axis and fixed in a direction substantially parallel to said x axis and a direction substantially parallel to said z axis;
- a carrier upon which said cartridge may rest, said carrier being mounted on and supported by said dolly so as to be movable with said dolly in said direction substantially parallel to said y axis and be movable relative to said dolly in said direction substantially parallel to said x axis, movement of said carrier in said direction substantially parallel to said y axis actuating said door opening mechanism and movement of said carrier in said direction substantially parallel to said x axis bringing said length of tape into read/write position relative to said head; and
- a motor for moving said length of tape within said cartridge along said magnetic head when said head is in a read/write position relative to said length of tape.

11. The cartridge drive of claim 10, wherein said dolly further comprises a carrier drive for propelling said carrier in the x direction relative to said dolly.

12. The cartridge drive of claim 11, further comprising a second elongate guide, wherein said dolly is directly supported solely by said first guide and said second guide.

13. The cartridge drive of claim 10, wherein said tape moving motor comprises a pivotable capstan drive motor.

14. A drive for an elongate, rectangular tape cartridge having a pair of sides and a pair of ends which are shorter than said sides, said cartridge enclosing a length of tape and including a door in one of said sides which is nearer to one of said ends than another of said ends, said door providing access to said length of tape, said drive comprising:
- an elongate housing having one end which forms a slot, said slot sized and shaped to receive said cartridge for loading into said housing with said one of said ends of said c cartridge which is nearer to said access door than said another of said ends being loaded into said slot first;
- a magnetic head;
- a ratchet mechanism mounted in said housing for at least partially opening aid door of said cartridge, said mechanism including a first portion having a set of serrate teeth and a second portion having an element mating with said set of serrate teeth, said element and said set of serrate teeth cooperating to prevent movement of said first portion relative said second portion in a given direction yet permitting movement of said first portion relative said second portion in a direction opposite said given direction, said mechanism including a leg connected to one of said portions for at least partially opening said door;
- a member mounted in said housing cooperating with one of said portion and said second portion to actuate said at least partial opening of said door of said cartridge by said ratchet mechanism; and
- a motor for moving said length of tape within said cartridge along said magnetic head when said head is in a read/write position relative to said length of tape.

15. The drive of claim 14, further comprising an actuator for said ratchet mechanism mounted on said housing.

16. A drive for an elongate, rectangular tape cartridge having a pair of sides, a pair of ends which are shorter than said sides, and a base plate having a portion at each end which forms a detent, said cartridge enclosing a length of tape and including a door in one of said sides proximate one of said ends for providing access to said length of tape, said drive comprising:
- an elongate housing having one end which forms a slot, said slot sized and shaped to receive the end of said cartridge proximate said access door when said cartridge is aligned with said end of said cartridge parallel to said slot;
- a magnetic head;
- an elongate table upon which said cartridge may rest, said table having at least one end mounted within said housing for receiving said end of said cartridge proximate said access door when said end of said cartridge proximate said access door is inserted through said slot, said table being movable relative to said head to position said length of tape in read/write position relative to said head, said head only being movable in a direction transverse to said length of tape to change tracks when said cartridge rests on said table;

a mechanism, for at least partially opening said door of said cartridge mounted within said housing;

a stop defining a registration surface for registering at least one surface of said base plate of said cartridge proximate said door, said stop being mounted on said housing so as to be rotatable away from said table to avoid interference with said mechanism for at least partially opening said door of said cartridge;

an arrangement for interacting with at least one of said detent forming portions of said base plate to bias said base plate against said stop; and a spacer secured to said table which presses against a portion of said arrangement for overcoming the bias of said arrangement to prevent said arrangement from interfering with the movement said table, wherein the movement of said table relative to said head to position said length of tape in read/write position relative to said head, causes said spacer to stop overcoming the bias of said arrangement to permit said arrangement to cooperate with at least one of said detent forming portions to bias said base plate against said stop.

17. The drive of claim 16 wherein said slot is formed in a bezel mounted on said end of said housing.

18. A drive for an elongate, rectangular tape cartridge having a pair of sides and a pair of ends which are shorter than said sides, said cartridge enclosing a length of tape and including a door in one of said sides proximate one of said ends for providing access to said length of tape, said drive comprising:

an elongate housing having one end which forms a slot sized and shaped to receive said ends of said cartridge when said cartridge is aligned with said ends of said cartridge parallel to said slot;

a magnetic head;

a mechanism for opening said door of said cartridge sufficiently to provide access to said length of tape by said head; and an elongate table mounted within said housing upon which said cartridge may rest, said table being movable at least in a direction substantially parallel to an x axis and also in a direction substantially parallel to a y axis, wherein said x axis and said y axis intersect and are perpendicular to one another, movement of said table in a direction substantially parallel to said y axis actuating said door opening mechanism when said cartridge rests on said table and movement of said table in a direction substantially parallel to said x axis bringing said length of tape into a read/write position relative to said head when said door opening mechanism has been actuated;

a table drive for moving said table in an x-y plane including said x-axis and said y-axis, said table drive comprising:

a gear assembly;

an elongate link having one end secured to said table and another end secured to said gear assembly for moving said table in said direction substantially parallel to said y axis; and means mounted on said table and driven by said gear assembly for propelling at least part of said table in said direction substantially parallel to said x axis.

19. The cartridge drive of claim 18, wherein said head is only movable in a direction transverse to said length of tape when said cartridge rests on said table.

20. A drive for an elongate, rectangular tape cartridge having a pair of sides and a pair of ends which are shorter than said sides, said cartridge enclosing a length of tape and including a door in one of said sides proximate one of said ends having a flange end and an access end for covering an access and for providing access to said length of tape within said access, said drive comprising:

an elongate housing having one end which forms a slot sized and shaped to receive said ends of said cartridge when said cartridge is aligned with said ends of said cartridge parallel to said slot;

a stationary magnetic head;

a mechanism for opening said door of said cartridge sufficiently to provide access to said length of tape by said head; and means for guiding and moving said cartridge so that said cartridge access door moves part said magnetic head while said access door is substantially closed, and for guiding and moving said cartridge toward said magnetic head once said access door is substantially opened by said mechanism to bring said length of tape within said access into a read/write position relative to said head.

21. A method of bringing a length of tape within an elongate rectangular cartridge having two sides and two ends which are shorter than said sides, including an access door having an access end and a flange end said door covering an access in one of the cartridge sides and positioned proximate one end of the cartridge into a read/write position relative to a stationary magnetic head positioned within a housing of a drive for said cartridge, said housing defining a space and one end of said drive defining an elongate slot into which said ends of said cartridge are insertable, said method comprising:

inserting the end of said cartridge proximate said access door through said slot so that said flange end of said access door is inserted through said slot before said access end;

moving said access end of said access door past said stationary magnetic head when said access door is closed;

opening said access door; and moving the portion of said length of tape within said access back toward said magnetic head after said access door has been opened.

22. A method of bringing a length of tape within an elongate rectangular cartridge into a read/write position relative to a magnetic head positioned within a housing of a drive for said cartridge, said cartridge having two sides and two ends which are shorter than said sides, and an access door having an access end and a flange end, said door covering an access to the tape within the cartridge, said access door being positioned on one of said sides, proximate an end of said cartridge, said drive housing defining a space for housing said cartridge and one end of said drive defining an elongate slot through which said cartridge is insertable in a direction substantially parallel to said cartridge sides, said method comprising:

inserting both of said ends of said cartridge through said slot;

moving said access end of said access door past said magnetic head when said access door is closed after inserting said both ends of said cartridge through said slot;

opening said access door after moving said access end of said access door past said magnetic head; and moving the portion of said length of tape within said access back toward said magnetic head after said access door has been opened.

23. A method of bringing a length of tape within an elongate rectangular cartridge into a read/write position relative to a magnetic head positioned within a housing of a drive for said cartridge, said cartridge having two sides and two ends which are shorter than said sides, said drive having a slot at one end said slot dimensioned to permit insertion of said cartridge into said housing, said slot defining an x axis, a y axis and a z axis, said axis being mutually orthogonal so as to define a coordinate system, with said slot extending in an x-z plane, said y-axis extending through said slot, said slot sized and shaped to receive one of the ends of said cartridge when said cartridge is aligned with said slot in said x-z plane and is inserted along said y axis in an x-y plane, wherein said head is only movable in a direction parallel to said z axis, said method comprising the steps of:

inserting said end of said cartridge proximate said access door through said slot along said y axis with said cartridge sides oriented substantially parallel to said y-axis;

moving said cartridge along said y axis so that said access door passes said magnetic head, after inserting said end proximate said access door through said slot;

opening said access door after said access door has been moved past said magnetic head;

moving the portion of said length of tape within said access back toward said magnetic head along said y axis after said access door has been opened; and next moving the portion of said length of tape within said access toward said magnetic head along an axis parallel to said x axis so as to cause operative engagement between said tape and said magnetic head.

24. The method of claim 23 wherein said cartridge is inserted into said drive with the end of said cartridge proximate said access door inserted before the end distal from said access door.

25. A drive for an elongate, rectangular tape cartridge having a pair of sides and a pair of ends which are shorter than said sides, said cartridge enclosing a length of tape and including a door in one of said sides proximate one of said ends for providing access to said length of tape, said drive comprising:

an elongate housing having one end which forms a slot sized and shaped to receive said cartridge when said cartridge is aligned with said ends of said cartridge parallel to said slot;

a stationary magnetic head;

a mechanism for opening said door of said cartridge sufficiently to provide access to said length of tape by said head; and a guiding means mounted within said housing which guides said cartridge to move in a plane defined by an x and a y axis, said x axis intersecting and being perpendicular to said y axis, said guide means guiding movement of said cartridge substantially parallel to said y axis so that at least a portion of said cartridge door travels past said magnetic head while said door is substantially closed, and so that movement of said cartridge substantially parallel to said x axis brings said tape into contact with said head after the opening of s said door by said door opening mechanism.

26. The drive of claim 25, wherein said guide means includes a table on which said cartridge rests, said table adapted to move parallel to both said x and y axes.

27. The drive of claim 25 wherein said drive is adapted to receive said cartridge with the end of said cartridge proximate said access door inserted before the end distal from said access door.

28. A drive for automatically loading an elongate, rectangular tape cartridge having a pair of sides and a pair of ends which are shorter than said sides, said cartridge enclosing a length of tape which is accessible by opening a pivoting door on one side of the cartridge, said drive comprising:

a housing having one end which forms a slot sized and shaped to receive an end of said cartridge when said end of said cartridge is inserted in said slot;

a magnetic head;

a rachet mechanism for opening said door of said cartridge to expose a segment of said length of tape;

a member mounted in said housing cooperating with said mechanism to actuate said opening of said door of said cartridge by said mechanism;

a means for moving said cartridge;

a means for guiding the movement of said cartridge in a plane defined by an x and a y axis, said x axis intersecting and being perpendicular to said y axis, said guide means guiding movement of said cartridge such that said cartridge moves linearly in a direction parallel to said y axis and linearly in a direction parallel to said x axis, said ratchet mechanism mounted on said guiding means; and a means for detecting the presence of said cartridge when said cartridge is at least partially manually inserted in said slot, wherein said detecting means actuates said guide means to automatically move said cartridge into said housing so that both ends of said cartridge are contained within said housing and guide said cartridge so that said exposed segment of tape comes into contact with said magnetic head.

29. The drive of claim 28, wherein said detecting means includes a microswitch which is depressed by said cartridge.

30. The drive of claim 28, wherein the cartridge is a ¼-inch tape cartridge, as defined by ANSI X3.55-1977, and the housing has external dimensions conforming with the 5¼ inch form factor.

31. The drive of claim 28, wherein said means for guiding the insertion of said cartridge and said means for moving said cartridge include an elongate table mounted at least partially within said housing upon which said cartridge may rest, movement of said table in the y direction actuating said door opening mechanism when said cartridge rests on said table, and movement of said table in the x direction bringing said length of tape into contact with said magnetic head.

32. The cartridge tape drive of claim 31, wherein said drive further comprises:

a gear assembly;

an elongate link having one end secured to said x-y table and another end secured to said gear assembly for moving said x-y table in the y direction; and means mounted on said x-y table and by said gear assembly for propelling at least part of said x-y table in the x direction.

33. The drive of claim 28, further comprising a means for automatically unloading the cartridge.

34. The drive of claim 28, wherein the magnetic head is stationary.

35. A drive for automatically loading an elongate, rectangular tape cartridge having a pair of sides and a pair of ends which are shorter than said sides, said cartridge enclosing a length of tape which is accessible by opening a pivoting door on one side of the cartridge, said drive comprising:
- a housing having one end which forms a slot sized and shaped to receive an end of said cartridge when said end of said cartridge is inserted in said slot;
- a magnetic head;
- a rachet mechanism for opening said door of said cartridge to expose a segment of said length of tape;
- a means for moving said cartridge;
- a means for guiding the movement of said cartridge in a plane defined by an x and a y axis, said x axis intersecting and being perpendicular to said y axis, said guide means guiding movement of said cartridge in at least directions which are parallel to said y axis and parallel to said x axis, said ratchet mechanism mounted on said guiding means;
- a means for detecting the presence of said cartridge when said cartridge is at least partially manually inserted in said slot, wherein said detecting means actuates said guide means to automatically move said cartridge into said housing so that both ends of said cartridge are contained within said housing and guide said cartridge so that said exposed segment of tape comes into contact with said magnetic head;
- an actuator for said ratchet mechanism mounted on said housing, wherein said ratchet mechanism comprises:
- a first pivot;
- a drive arm rotatably mounted on said first pivot so that loading of said cartridge into said housing causes said drive arm to engage said actuator and rotate about said pivot;
- a second pivot;
- a ratchet rotatably mounted on said second pivot operatively engaging said drive arm so that pivoting of said drive arm causes rotation of said ratchet, said ratchet including an annulus defining a series of peaks spaced from one another by valleys;
- a third pivot; and
- a leg rotatably mounted on said third pivot operatively engaging said annulus of said ratchet so that rotation of said ratchet cause rotation of said leg into engagement with the door of a cartridge resting on said table, wherein the selective rotation of said leg opens the door.

* * * * *

UNITED STATES PATENT AND TRADEMARK OFFICE
CERTIFICATE OF CORRECTION

PATENT NO. : 5,237,469

DATED : August 17, 1993

INVENTOR(S) : Jagmohan S. Kukreja; and Kurt A. Buckland

It is certified that error appears in the above-identified patent and that said Letters Patent is hereby corrected as shown below:

In Claim 20
Column 28, line 18, change "part" to --past--.

Signed and Sealed this

Twelfth Day of April, 1994

Attest:

BRUCE LEHMAN

Attesting Officer       Commissioner of Patents and Trademarks